(12) United States Patent
Ahlström et al.

(10) Patent No.: US 12,238,558 B2
(45) Date of Patent: Feb. 25, 2025

(54) CELL GLOBAL IDENTIFIER REPORTING IN A WIRELESS COMMUNICATION SYSTEM

(71) Applicant: Telefonaktiebolaget LM Ericsson (publ), Stockholm (SE)

(72) Inventors: Tobias Ahlström, Ljungsbro (SE); Icaro L. J. da Silva, Solna (SE); Helka-Liina Määttanen, Helsinki (FI); Parisa Pakniat, Norrköping (SE); Kristina Zetterberg, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 576 days.

(21) Appl. No.: 16/321,344

(22) PCT Filed: Nov. 16, 2018

(86) PCT No.: PCT/SE2018/051187
§ 371 (c)(1),
(2) Date: Jan. 28, 2019

(87) PCT Pub. No.: WO2019/098934
PCT Pub. Date: May 23, 2019

(65) Prior Publication Data
US 2020/0092738 A1    Mar. 19, 2020

Related U.S. Application Data

(60) Provisional application No. 62/587,361, filed on Nov. 16, 2017.

(51) Int. Cl.
*H04W 24/10* (2009.01)
*H04W 8/22* (2009.01)
*H04W 72/04* (2023.01)

(52) U.S. Cl.
CPC ............ *H04W 24/10* (2013.01); *H04W 8/22* (2013.01); *H04W 72/04* (2013.01)

(58) Field of Classification Search
CPC ....... H04W 24/10; H04W 72/04; H04W 8/22; H04W 36/0061; H04W 24/02
(Continued)

(56) References Cited

U.S. PATENT DOCUMENTS

2012/0165020 A1* 6/2012 Iwamura ........... H04W 36/0094
455/436
2014/0087715 A1* 3/2014 Suzuki ................. H04W 24/10
455/422.1
(Continued)

FOREIGN PATENT DOCUMENTS

CN    102356666 A    2/2012
EP    2445248 A1    4/2012
(Continued)

OTHER PUBLICATIONS

"3rd Generation Partnership Project; Technical Specification Group Radio Access Network; NR; Radio Resource Control (RRC); Protocol specification (Release 15 )", 3GPP TS 38.331 V0.1.0, Oct. 2017, pp. 1-42.
(Continued)

*Primary Examiner* — Nizam U Ahmed
(74) *Attorney, Agent, or Firm* — Murphy, Bilak & Homiller, PLLC

(57) ABSTRACT

A wireless device (111) is configured to receive, from a network node (101), in a measurement reporting configuration information element (127) of a measurement configuration or a measurement identity information element (129) of a measurement configuration, an indication (128) of for which cell the wireless device (111) (111) is to report a cell global identifier, CGI. In embodiments in which the indica-
(Continued)

tion (128) is received in the measurement reporting configuration information element (127), for instance, the wireless device (111) may add a reporting configuration indicated by that information element to a list of reporting configurations at the wireless device (111), e.g., as opposed to updating an existing reporting configuration. Regardless, the wireless device (111) may also be configured to report a CGI for the cell indicated by the received indication (128).

24 Claims, 24 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0289156 A1* | 10/2015 | Jung | H04W 24/10 370/252 |
| 2018/0049047 A1* | 2/2018 | Lin | H04L 27/2602 |
| 2018/0220458 A1* | 8/2018 | Ouchi | H04W 16/14 |
| 2019/0182729 A1* | 6/2019 | Lu | H04W 24/10 |

FOREIGN PATENT DOCUMENTS

| | | |
|---|---|---|
| JP | 2011193441 A | 9/2011 |
| JP | 2014525698 A | 9/2014 |
| RU | 2498531 C2 | 11/2013 |
| RU | 2503146 C2 | 12/2013 |
| WO | 2017024823 A1 | 2/2017 |
| WO | 2017026415 A1 | 2/2017 |

OTHER PUBLICATIONS

"3GPP TS 36.331 V14.4.0 (Sep. 2017)", 3rd Generation Partnership Project; Technical Specification Group Radio Access Network; Evolved Universal Terrestrial Radio Access (E-UTRA); Radio Resource Control (RRC); Protocol specification (Release 14), Sep. 2017, pp. 1-94.

Huawei, et al., "Measurement trigger type in NR", 3GPP TSG-RAN WG2#99, R2-1708708, Berlin, Germany, Aug. 21-25, 2017, 1-5.

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT);", 3GPP TS 37.320 V14.0.0, Mar. 2017, 1-26.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sec 5.5.2, Sep. 2017, pp. 136-144.

Unknown, Author, "ANR Framework in NR", 3GPP TSG-RAN WG2 #99bis, Tdoc R2-1710842, Prague, Czech Republic, Oct. 9-13, 2017, pp. 1-4.

Unknown, Author, "Automatic Neighbour Relation in NR", 3GPP TSG-RAN WG2 #99bis, R2-1710543, Prague, Czech Republic, Oct. 9-13, 2017, pp. 1-4.

Unknown, Author, "Measurements interruption upon report CGI configuration", 3GPP TSG-RAN WG2 Meeting #79bis, R2-124458, Bratislava, Slovakia, Oct. 8-13, 2012, pp. 1-3.

Unknown, Author, "UE behaviour upon CGI reporting", 3GPP TSG-RAN WG2 NR-AH#1801, Tdoc R2-1801310, Vancouver, Canada, Jan. 22-26, 2018, pp. 1-3.

Unknown, Author, "UE Measurements and Reporting of Global Cell Identity", 3GPP TSG-RAN WG2 #58bis, R2-072674, Orlando, USA, Jun. 25-29, 2007, pp. 1-2.

* cited by examiner

```
                              ReportConfigEUTRA
periodical                    SEQUENCE {
    purpose                   ENUMERATED {
                                  reportStrongestCells, reportCGI}
    cellForWhichToReportCGI   PhysCellId           OPTIONAL
```

FIG. 2B

```
                              MeasId information element

MeasId ::=                    INTEGER (1..maxMeasId)

cellForWhichToReportCGI       PhysCellId           OPTIONAL
```

FIG. 2D

```
                                    ReportConfigEUTRA
-- ASN1START

ReportConfigEUTRA ::=         SEQUENCE {
    triggerType                   CHOICE {
        event                         SEQUENCE {
            eventId                       CHOICE {
                eventA1                       SEQUENCE {
                    a1-Threshold                  ThresholdEUTRA
                },
                eventA2                       SEQUENCE {
                    a2-Threshold                  ThresholdEUTRA
                },
                eventA3                       SEQUENCE {
                    a3-Offset                     INTEGER (-30..30),
                    reportOnLeave                 BOOLEAN
                },
                eventA4                       SEQUENCE {
                    a4-Threshold                  ThresholdEUTRA
                },
                eventA5                       SEQUENCE {
                    a5-Threshold1                 ThresholdEUTRA,
                    a5-Threshold2                 ThresholdEUTRA
                },
                ...,
                eventA6-r10                   SEQUENCE {
                    a6-Offset-r10                 INTEGER (-30..30),
                    a6-ReportOnLeave-r10          BOOLEAN
                },
                eventC1-r12                   SEQUENCE {
                    c1-Threshold-r12              ThresholdEUTRA-v1250,
                    c1-ReportOnLeave-r12          BOOLEAN
                },
                eventC2-r12                   SEQUENCE {
                    c2-RefCSI-RS-r12              MeasCSI-RS-Id-r12,
                    c2-Offset-r12                 INTEGER (-30..30),
                    c2-ReportOnLeave-r12          BOOLEAN
                }
            },
            hysteresis                    Hysteresis,
            timeToTrigger                 TimeToTrigger
        },
        periodical                    SEQUENCE {
            purpose                       ENUMERATED {
                                              reportStrongestCells, reportCGI}
        }
    },
    triggerQuantity               ENUMERATED {rsrp, rsrq},
    reportQuantity                ENUMERATED {sameAsTriggerQuantity, both},
    maxReportCells                INTEGER (1..maxCellReport),
    reportInterval                ReportInterval,
    reportAmount                  ENUMERATED {r1, r2, r4, r8, r16, r32, r64, infinity},
    cellForWhichToReportCGI       PhysCellId                    OPTIONAL
```

FIG. 2C

CELL GLOBAL IDENTIFIER REPORTING IN A WIRELESS COMMUNICATION SYSTEM

TECHNICAL FIELD

The present application relates generally to a wireless communication system in which a cell is identified by a cell global identifier, and relates more particularly to configuring a wireless device to report a cell global identifier for a cell.

BACKGROUND

A cell global identifier (CGI) is a global identifier of a cell in a wireless communication system. The global nature of the cell suggests that the CGI may be unique such that the CGI unambiguously identifies the cell amongst all other cells in the system. This may contrast with non-global or non-unique cell identifiers, such as a physical cell identifier (PCI). Indeed, in some circumstances where a wireless device uses only a PCI to identify a cell to a network node in the system, but the PCI alone is not sufficient to unambiguously identify the cell to the network node (e.g., due to PCI conflict with another cell), the network node may request that the wireless device report the CGI of the cell as well.

According to known approaches, a network node configures a wireless device to report a CGI of a cell by updating a so-called measurement object at the wireless device. A measurement object in this regard is an object (e.g., carrier frequency or cell) on which the wireless device is to perform a measurement. The wireless device accordingly tracks the measurements that it performs on this measurement object. When the measurement object is updated, the wireless device flushes its record of the measurements performed on that measurement object. Accordingly, updating a measurement object in order to prompt the wireless device to report a CGI for a cell causes the wireless device to flush the record of the measurements it has performed on that measurement object.

SUMMARY

Some embodiments herein configure a wireless device to report a cell global identifier (CGI) for a cell, e.g., in a way that advantageously preserves the wireless device's record of measurements performed on a measurement object. In some embodiments, for instance, the wireless device selectively flushes its record of measurements performed on a measurement object based on whether an update to that measurement object only configures the wireless device to report the CGI for a cell. In other embodiments, the network node transmits control signaling to the wireless device that (explicitly) indicates whether the wireless device is to flush the measurements performed on a measurement object. Still other embodiments configure the wireless device to report CGI for a cell by leveraging a measurement reporting configuration of a measurement configuration or a measurement identity of a measurement configuration, instead of the measurement object of the measurement configuration. Moreover, these embodiments may do so by adding a new measurement reporting configuration or new measurement identity, rather than updating an existing measurement reporting configuration or measurement identity. This addition, not modification, may effectively prevent the wireless device from flushing its record of measurements and timers, yet still configure the wireless device to report the CGI of a cell.

More particularly, embodiments herein include a method performed by a wireless device. The method includes receiving, by the wireless device, from a network node, in a measurement reporting configuration information element or a measurement identity information element of a measurement configuration, an indication of for which cell the wireless device is to report a CGI. The indication may for instance indicate for which cell the wireless device is to report a CGI by indicating a physical cell identity, PCI, of the cell for which the wireless device is to report a CGI. Regardless, in some embodiments, the method further includes reporting a CGI for a cell indicated by the received indication.

In some embodiments, the indication is received in the measurement reporting configuration information element.

In one or more embodiments, the measurement reporting configuration information element indicates a reporting configuration. The reporting configuration may include the indication. In this case, the method in some embodiments may also include adding the reporting configuration to a list of reporting configurations at the wireless device, e.g., as opposed to updating an existing reporting configuration at the wireless device.

In some embodiments, a reporting configuration indicated by the measurement reporting configuration information element is linked via a measurement identity to a measurement object at the wireless device. In this case, the method in some embodiments may also include, responsive to receiving the indication, maintaining any measurement reporting entry for the measurement identity in a list of measurement reporting entries at the wireless device. Alternatively or additionally, the method may further include receiving an update to the measurement object at the wireless device and, responsive to receiving the update, removing a measurement reporting entry for the measurement identity from a list of measurement reporting entries at the wireless device and stopping a timer for the measurement identity. That is, the wireless device may flush measurements performed on the measurement object in this case.

Embodiments herein also include a method performed by a network node. The method includes transmitting, by the network node, to a wireless device, in a measurement reporting configuration information element of a measurement configuration or a measurement identity information element of a measurement configuration, an indication of for which cell the wireless device is to report a CGI. The indication may for instance indicate which cell the wireless device is to report a CGI by indicating a physical cell identity, PCI, of the cell for which the wireless device is to report a CGI. This may be performed for instance after determining which cell the wireless device is to report CGI. Regardless, in some embodiments, the method further includes receiving from the wireless device a report of a CGI for a cell indicated by the indication.

In some embodiments, the indication is transmitted in the measurement reporting configuration information element.

In one or more embodiments, the measurement reporting configuration information element indicates a reporting configuration that the wireless device) is to add to a list of reporting configurations at the wireless device, e.g., as opposed to updating an existing reporting configuration at the wireless device. In one or more of these embodiments, the reporting configuration may include the indication.

In some embodiments, a reporting configuration indicated by the measurement reporting configuration information element is linked via a measurement identity to a measurement object at the wireless device.

Embodiments also include corresponding apparatus, computer programs, and carriers. For example, embodiments herein include a wireless device. The wireless device is configured (e.g., via one or more processing circuits) to receive, from a network node, in a measurement reporting configuration information element or a measurement identity information element of a measurement configuration, an indication of for which cell the wireless device is to report a CGI. The indication may for instance indicate for which cell the wireless device is to report a CGI by indicating a physical cell identity, PCI, of the cell for which the wireless device is to report a CGI. Regardless, in some embodiments, the wireless device is also configured to report a CGI for a cell indicated by the received indication.

Embodiments further include a network node. The network node is configured (e.g., via one or more processing circuits) to transmit, to a wireless device, in a measurement reporting configuration information element of a measurement configuration or a measurement identity information element of a measurement configuration, an indication of for which cell the wireless device is to report a CGI. The indication may for instance indicate which cell the wireless device is to report a CGI by indicating a physical cell identity, PCI, of the cell for which the wireless device is to report a CGI. This may be performed for instance after determining which cell the wireless device is to report CGI. Regardless, in some embodiments, the network node may also be configured to receive from the wireless device a report of a CGI for a cell indicated by the indication.

BRIEF DESCRIPTION OF THE DRAWINGS

FIG. 2B is a ReportConfigEUTRA information element according to some embodiments.

FIG. 2C is a ReportConfigEUTRA information element according to other embodiments.

FIG. 2D is a MeasId information element according to some embodiments.

DETAILED DESCRIPTION

Figure 1A:
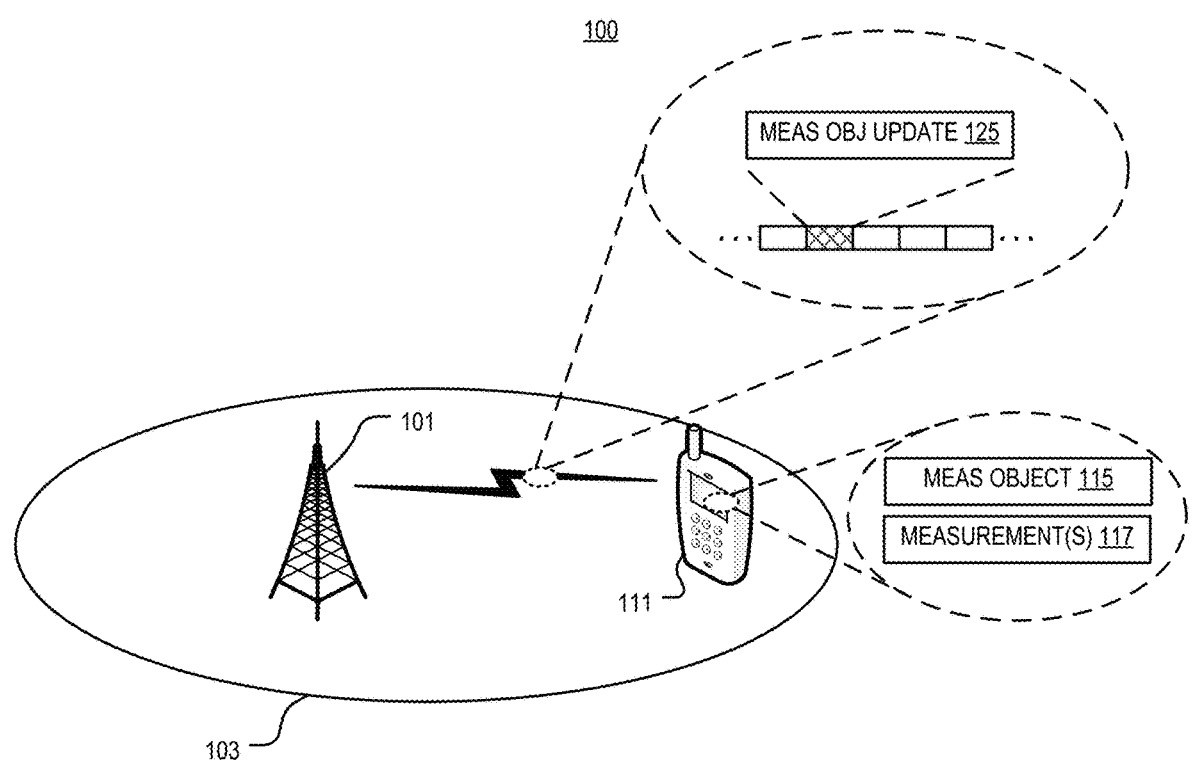
FIG. 1A is a block diagram of a wireless communication system that includes a network node and a wireless device according to some embodiments.

FIG. 1A illustrates one embodiment of a system 100 (e.g., a Long Term Evolution, LTE, system or New Radio, NR, system) in accordance with various aspects as described herein. In FIG. 1A, the system 100 may include a network node 101 (e.g., base station, gNB, eNB, or the like) and a wireless device 111 (e.g., UE). The network node 101 may serve, provide, or otherwise be associated with cell 103. The cell 103 in some sense may refer to the geographical coverage area of the network node 101, e.g., as covered by one or more particular carriers transmitted and/or received by the network node 101. The cell 103 in another sense, depending on its particular usage, may refer to or be associated with a carrier itself.

In one example, the cell 103 is identified by or otherwise associated with one or more cell identities. The one or more cell identities may include for instance a cell global identity (CGI), which may be globally unique. The one or more cell identities may alternatively or additionally include a physical cell identity (PCI), which may be globally non-unique. The CGI may provide means to geographically locate a connected wireless device, e.g., based on the globally unique nature of the CGI.

Although not shown, the system 100 may include one or more other cells which may be served by the same or a different network node. Each of these one or more other cells may likewise be respectively associated with one or more cell identities, such as a CGI and PCI.

In some embodiments, the network node 101 configures the wireless device 111 to report a CGI for a certain cell, e.g., cell 103 or some other cell. The network node 101 may do so for instance after the wireless device 111 reports a measurement to the network node 101 as having been performed on a cell identified with a certain PCI, but the PCI does not unambiguously identify to the network node 101 on which cell the measurement was performed, e.g., due to a PCI conflict where multiple cells are identified by the same PCI. In this case, then, the network node 101 may request the wireless device 111 to report the CGI for the cell on which the measurement was performed. As another example, the network node 101 may configure the wireless device 111 to report a CGI for a cell that is a CSG cell.

No matter the particular reason for configuring the wireless device 111 to report a CGI for a cell, the network node 101 in some embodiments does so by updating a measurement object 115 at the wireless device 111. The measurement object 115 may for instance be, as part of a measurement configuration, included in a list of objects (e.g., carrier frequencies) on which the wireless device 111 is to perform measurements. Instead of unconditionally flushing or resetting its record of measurements performed on the updated measurement object 115, though, the wireless device 111 according to some embodiments selectively does so based on whether the update only configures the wireless device 111 to report the CGI for a cell. If for instance the update only configures the wireless device 111 to report the CGI for a cell, the wireless device 111 in some embodiments maintains its record of measurements performed on the measurement object 115, e.g., so as to preserve that record. The wireless device 111 may similar maintain any timers that are applicable for the measurement object 115.

More particularly, in one embodiment, the network node 101 determines an update 125 to the measurement object 115 at the wireless device 111. The network node 101 then transmits the update 125 to the wireless device 111. Further, the wireless device 111 receives the update 125 to the measurement object 115 at the wireless device 111 and then determines whether the update 125 only configures the wireless device 111 to report a CGI for a cell. Next, the wireless device 111 maintains or resets measurements 117 performed on that object 115 based on whether the update 125 only configures the device to report a CGI for a cell. For example, the wireless device 111 may maintain the measurements 117 if the update 125 only configures the wireless device 111 to report a CGI for a cell, but may reset the measurements 117 if the update 125 does not just configure the wireless device 111 to report a CGI for a cell.

In these embodiments, then, the measurement object update 125 may not itself explicitly indicate whether the wireless device 111 is to maintain or reset the measurements 117 performed on the measurement object 115. Instead, the wireless device 111 intelligently deduces from the nature of the update 125 whether to maintain or reset the measurements 117.

Figure 1B:
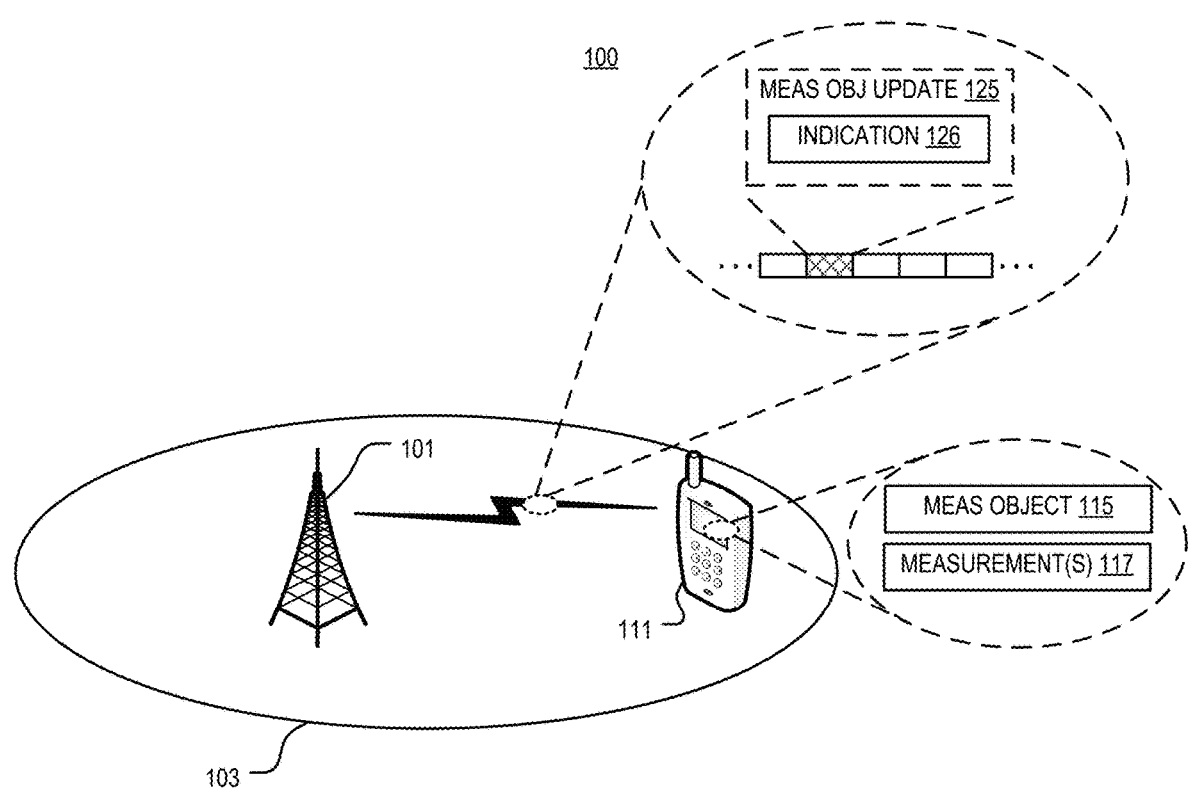
FIG. 1B is a block diagram of a wireless communication system that includes a network node and a wireless device according to other embodiments.

In other embodiments, by contrast, the network node 101 transmits control signaling to the wireless device 111 that indicates whether the wireless device 111 is to maintain or reset the measurements 117. The wireless device 111 in this case may simply maintain or reset the measurements 117 based strictly on whether the control signaling commands the wireless device 111 to do so, rather than based on the device's own evaluation of the nature of the update 125. The network node 101 in this case may maintain more control over whether and/or when the measurements 117 are reset, e.g., for any reason. FIG. 1B illustrates one example of these embodiments.

As shown in FIG. 1B, the network node 101 determines whether to maintain or reset the measurements 117 performed by the wireless device 111 on the measurement object 115. The network node 101 then transmits, to the wireless device 111, an indication 126 of whether to maintain or reset measurements 117 performed by the wireless device 111 on the measurement object 115. The indication 126 may for instance be included in the measurement object update 125 as shown in FIG. 1B and/or indicate which cell the wireless device 111 is to report a CGI by indicating a physical cell identity (PCI) of that cell. Regardless, the wireless device 111 receives the indication 126 of whether to maintain or reset measurements 117 performed by the wireless device 111 on the measurement object 115. Further, the wireless device 111 determines whether to maintain or reset measurements 117 performed on that object 115 based on the indication 126.

Figure 1C:
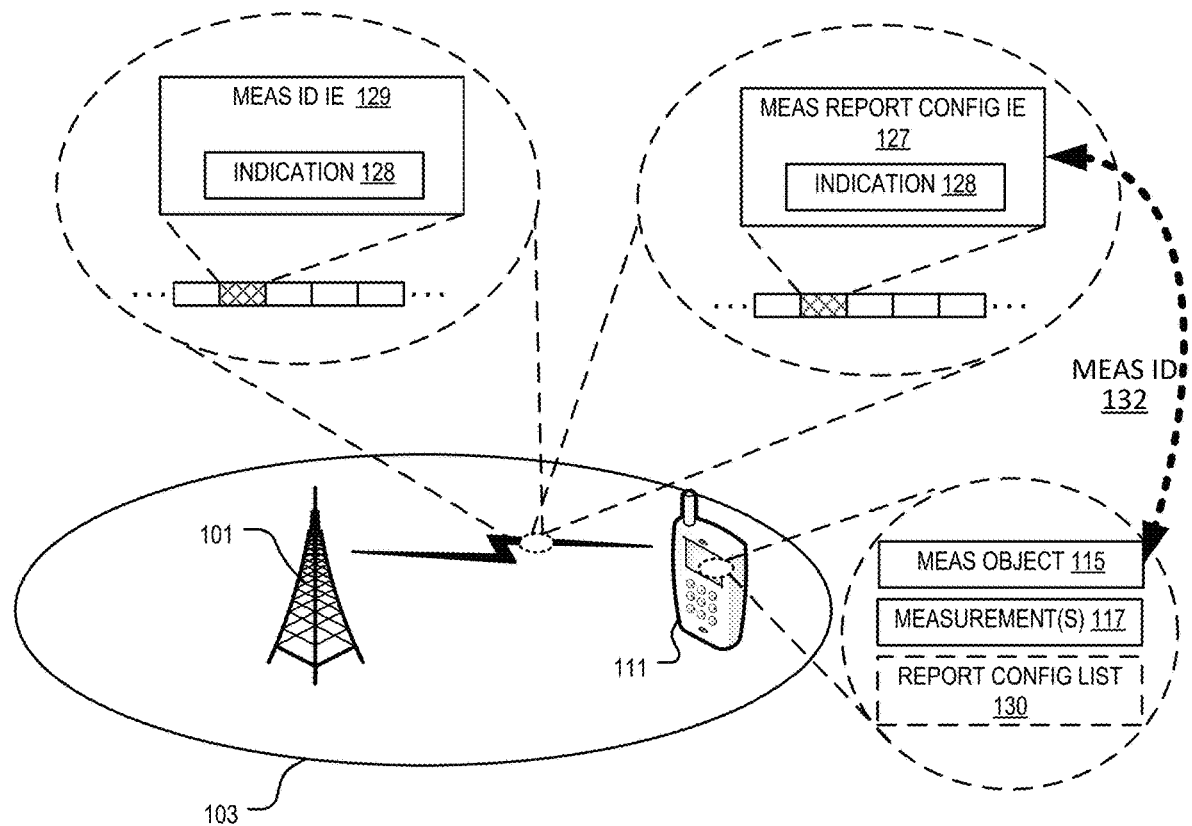
FIG. 1C is a block diagram of a wireless communication system that includes a network node and a wireless device according to still other embodiments.

In still other embodiments, the network node 101 configures the wireless device 111 to report a CGI for a cell by leveraging a different part of a measurement configuration besides the measurement object 115. For example, the network node 101 may leverage a measurement reporting configuration of a measurement configuration or a measurement identity of a measurement configuration, instead of the measurement object 115 of the measurement configuration. Moreover, rather than updating the measurement reporting configuration or the measurement identity, the network node 101 in some embodiments may add a new measurement reporting configuration or a new measurement identity, e.g., in association with the measurement object 115. The network node 101 may do so even though it may be prohibited from adding a new measurement object in association with the same frequency or cell. In this way, by adding a new measurement reporting configuration or a new measurement identity, rather than updating an existing measurement reporting configuration or an existing measurement identity, the network node 101 may effectively prevent the wireless device 111 from flushing or resetting its record of measurements 117 and timers, yet still configure the wireless device 111 to report the CGI of a cell. FIG. 1C illustrates one example of these embodiments.

As shown in FIG. 1C, the network node 101 transmits, to the wireless device 111, in a measurement reporting configuration information element (IE) 127 or a measurement identity IE 129 of a measurement configuration, an indication 128 of for which cell the wireless device 111 is to report a CGI. The indication 128 may for instance indicate a PCI of the cell for which the wireless device 111 is to report a CGI. Regardless, the wireless device 111 correspondingly receives the indication 128 in the measurement reporting configuration IE 127 or the measurement identity information element 129 of the measurement configuration.

In some embodiments in which the indication 128 is included in the measurement reporting configuration IE 127, the indication 128 may be included in the reporting configuration indicated by the measurement reporting configuration IE 127. In fact, the reporting configuration may be included in a list of reporting configuration(s) (in the measurement reporting configuration IE 127) that the wireless device 111 is to add. In this and other cases, then, the wireless device 111 may be configured to add that (new) reporting configuration to a list of reporting configurations 130 at the wireless device 111, e.g., as opposed to updating an existing one of the reporting configurations in the list 130. This adding of the reporting configuration, rather than updating of an existing reporting configuration, may prevent the wireless device 111 from flushing or resetting the measurements 117 performed on the measurement object 115.

In this regard, the reporting configuration indicated by the measurement reporting configuration IE 127 may be linked via a measurement identity 132 to the measurement object 115 at the wireless device 111. Despite this, even responsive to receiving the indication 128 in the measurement reporting configuration IE 127, the wireless device 111 nonetheless maintains any measurement reporting entry for the measurement identity 132 in a list of measurement reporting entries at the wireless device 111. That is, the wireless device 111 maintains the measurements 117 in FIG. 1C representing these measurement reporting entries. Moreover, the wireless device 111 may do so even though the wireless device 11 may have otherwise flushed those measurement reporting entries had it updated the measurement object 115. That is, the wireless device 111 may still be configured to remove a measurement reporting entry for the measurement identity 132 from a list of measurement reporting entries at the wireless device 111 (and stop a timer for the measurement identity 132), responsive to receiving an update to the measurement object 115.

Note that the network node 101 in FIG. 1A, 1B, or 1C may be configured to support one or more communication systems such as LTE, UMTS, GSM, NB-IoT, 5G New Radio (NR), the like, or any combination thereof. Further, the network node 101 may be a base station, an access point, or the like. Also, the network node 101 may serve wireless device 111. The wireless device 111 may be configured to support one or more communication systems such as LTE, UMTS, GSM, NB-IoT, 5G NR, the like, or any combination thereof.

Some embodiments will nonetheless now be exemplified in the context of an LTE or NR system. These embodiments may however be extended as applicable to other types of systems as well.

The wireless device 111 may be a user equipment (UE). A UE performs measurements to monitor and report the signal level and quality of its serving cell and neighboring cell(s). These measurements assist the radio network to choose a suitable serving cell for the UE. There are different reasons to relocate a UE from a current serving cell to another cell, such as coverage reasons, traffic load level or support of a specific service.

UE measurements are configured by the radio network. Several parameters are involved to specify the conditions for measurements and reporting. In Long Term Evolution (LTE), for example, UE measurement configurations provided by the Evolved Universal mobile telecommunications system Terrestrial Radio Access Network (EUTRAN) to the UE are specified in the 3GPP TS 36.331 EUTRA radio resource control (RRC) Protocol Specification. The corresponding specification, 3GPP TS 38.331 NR RRC Protocol Specification, is currently being prepared for New Radio (NR) which is expected to be partly similar to the EUTRAN version where applicable.

The measurement configuration framework in NR will be based on the framework from LTE, described in 3GPP TS 38.331. In NR, the network can configure an RRC_CONNECTED UE to perform cell level and beam level measurements and report them in accordance with the measurement configuration. The measurement configuration is provided by means of dedicated signaling.

The network can configure the UE to perform the following types of measurements: (i) Intra-frequency measurements: measurements at the downlink carrier frequency(ies) of the serving cell(s); (ii) Inter-frequency measurements: measurements at frequencies that differ from any of the downlink carrier frequency(ies) of the serving cell(s); and (iii) Inter-RAT measurements of E-UTRA frequencies. The measurement configuration includes the following parameters: (1) measurement objects; (2) reporting configurations; (3) measurement identities; (4) quantity configurations; and (5) measurement gaps.

Measurement objects refer to a list of objects on which the UE shall perform the measurements. For intra-frequency and inter-frequency measurements, a measurement object is associated to an NR downlink carrier frequency. For inter-RAT E-UTRA measurements, a measurement object is a single E-UTRA downlink carrier frequency.

Reporting configurations refer to a list of reporting configurations where there can be one or multiple reporting configurations per measurement object. Each reporting configuration consists of the following: (i) Reporting criterion: The criterion that triggers the UE to send a measurement report which can either be event triggered or periodical. The criterion also includes a trigger quantity (reference signal received power, RSRP, reference signal received quality, RSRQ, or signal-to-interference-plus-noise ratio, SINR); (ii) reference signal (RS) type: The RS to be considered by the UE for cell level and beam level measurements (e.g., NR synchronization signal, NR-SS, or channel state information reference signal, CSI-RS, which is new aspect in NR that cell quality can be computed based on two types of RSs, NR-SS (basically the NR primary synchronization signal, NR-PSS, and/or the NR secondary synchronization signal, NR-SSS) and CSI-RS); and (iii) Reporting format: The cell level and beam level quantities that the UE includes in the measurement report (RSRP and/or RSRQ and/or SINR) and associated information (e.g. number of cells and/or beams to report).

Measurement identities refer to a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

Regarding quantity configurations, one quantity configuration is configured per radio access technology (RAT) type. The quantity configuration defines the measurement quantities and associated filtering used for all event evaluation and related reporting of that measurement type.

Measurement gaps refer to periods that the UE may use to perform measurements, i.e. no (uplink, downlink) transmissions are scheduled.

E-UTRAN may configure the UE to report an extended cell global identifier (ECGI)/NR cell global identifier (NCGI) under some circumstances, e.g., when there is an underlying physical cell identity (PCI) confusion situation. According to current specification TS 36.331, i.e., LTE, when E-UTRAN wants the UE to report an ECGI/NCGI, it configures a periodic measurement with purpose to report ECGI/NCGI. It also configures the physical cell identity (PCI), where the UE should report ECGI/NCGI, in the Measurement objects of the IE MeasConfig. That is, the configuration of which cell to report CGI for, cellForWhichToReportCGI, is given in the measurement object in LTE. 3GPP TS 36.331 V14.4.0. This means that the measurement object is modified (with a new cellForWhichToReportCGI) every time a CGI measurement is needed. The modification is indicated to the UE using the measObjectToAddModList.

Upon receiving the measObjectToAddModList, the UE shall;
1> for each measObjectId included in the received measObjectToAddModList:
2> if an entry with the matching measObjectId exists in the measObjectList within the VarMeasConfig, for this entry:
. . .

3> for each measId associated with this measObjectId in the measIdList within the VarMeasConfig, if any:
4> remove the measurement reporting entry for this measId from the VarMeasReportList, if included;
4> stop the periodical reporting timer or timer T321, whichever one is running, and reset the associated information (e.g. timeToTrigger) for this measId;

This means that each time a CGI measurement is needed, the UE will forget about the previous reports it had already sent for the measurement object, for example the mobility measurement report which triggered the CGI measurements. That is, the UE will handle the change of the measurement object by resetting all measurements that were done on that object. This, as well as the stopping of the periodical reporting timer and reset of the time to trigger, will lead to unnecessary measurement reports being sent to the network.

One other disadvantage is that this is a separate measurement done by the UE; hence it is not connected to the event-based measurements. Hence the radio base station (RBS) needs to configure event-based measurements and periodical measurement with purpose report ECGI/NCGI separately, in order for the UE to detect a target cell with a given PCI and after that trigger the UE to report the ECGI/NCGI, causing unnecessary delays of the handover (HO).

One other even worse alternative is that the RBS needs to have a separate measurement with purpose report ECGI/NCGI for a PCI always ongoing, meaning reconfigured in the UE once in a while (e.g., 1 sec for EUTRAN and 8 sec for GSM EDGE radio access network (GERAN) and UTRAN) since in 3GPP these measurements are only valid for the UE a couple of seconds and is then automatically removed. This is a problem in several situations. First, it is a problem if there is an underlying PCI confusion situation, where the PCI is not enough for the RBS to distinguish the target cell based on a PCI report and hence may require ECGI/NCGI readings to do so. Second, it is a problem if the target cell is a closed subscriber group (CSG) cell, where it is essential for the UE to report ECGI/NCGI and related information. Third, the current behavior impacts negatively all ongoing measurements due to changes on the Measurement object, which causes the UE to forget cells already measured.

Some embodiments allow to improve the ECGI/NCGI measurement handling. Different options are proposed with different flexibilities. These includes either moving the cell for which to report ECGI/NCGI from measurement object to report configuration, or to MeasID, or to keep it on the measurement object but change the UE behavior associated with this.

Some embodiments include one or more of the following advantages: (i) less RRC signaling due to configuration/deconfiguration of measurements and less unnecessary UE measurement reports; (ii) more intuitive way to configure ECGI/NCGI measurements; (iii) faster HO, especially for the case where there is an underlying PCI confusion or the target cell is a CSG cell; and (iv) more efficient measurement which could be ongoing parallel with ECGI/NCGI measurement, configured together or directly after one another, e.g., a UE first detects the PCI and directly after that reads the ECGI/NCGI and sends the information in one report or in two.

Figure 2A:
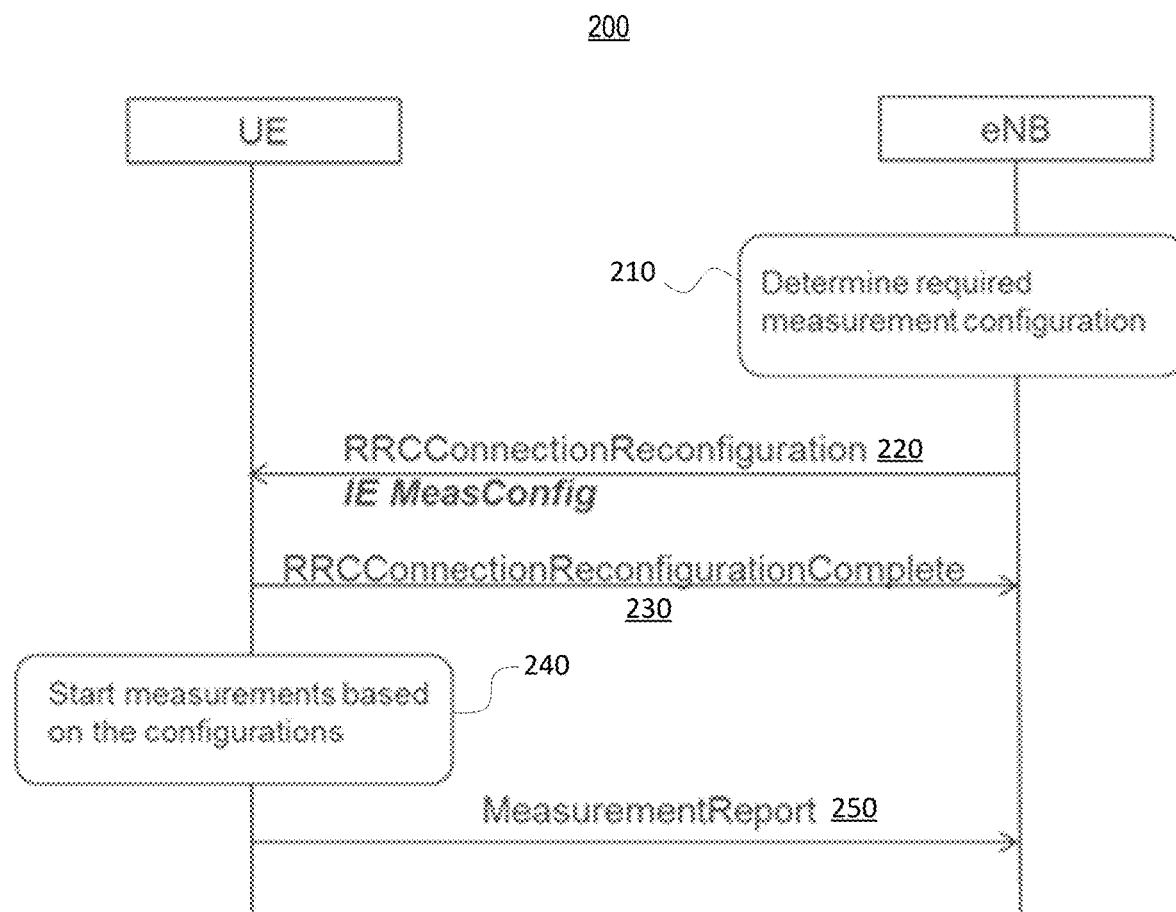
FIG. 2A is a call flow diagram of signaling for a radio network node to configure wireless device measurements according to some embodiments.

FIG. 2A shows the signaling involved when the radio network (e.g., eNB or gNB) configures UE measurements through dedicated signaling using RRCConnectionReconfiguration message. As shown, the eNB determines a required measurement configuration (Step 210). The eNB accordingly sends an RRCConnectionReconfiguration message with the IE MeasConfig to the UE indicating the determined measurement configuration (Step 220). The UE responds with an RRCConnectionReconfigurationComplete message (Step 230) and starts measurements based on the indicated measurement configuration (Step 240). The UE then sends a measurement report to the eNB that reports the performed measurements (Step 250). It is also possible to configure the measurements via RRCConnectionResume message (not shown in the figure).

The UE can be requested to perform intra-frequency, inter-frequency and/or inter-RAT measurements. These could include both PCI and ECGI/NCGI measurements. Depending on the UE capability, the UE may require measurement gaps, DRX or autonomous gaps to perform these measurements.

Some embodiments include new ways of handling/configuring ECGI/NCGI measurements comparing to LTE specifications as described in TS 36.331.

In one specific example of the embodiment shown in FIG. 1A, the cellForWhichToReportCGI remains in a measurementObject such that the measurement object indicates the cell for which the UE is to report a CGI. However, the UE behavior upon receiving an measObjectToAddModList is such that the UE does not flush the measurement reporting entry and timers if the only update in the measurementObject is on the cellForWhichToReportCGI, i.e., if the only update in the measurement object is related to which cells to report CGI for.

In another specific example of the embodiment shown in FIG. 1B, the above is achieved by adding an additional flag, for example keepReportingEntryAndTimers, to the measurementObject so that the UE does not need to flush the earlier measurements. That is, this flag operates as an explicit indicator or command as to whether the UE is to maintain the earlier measurements.

In another alternative example of the embodiment shown in FIG. 1B, the flag is defined in an opposite way. For example, "resetReportingEntryAndTimers" is used to flag that the UE should flush the earlier measurements. This flag similarly operates as an explicit indicator or command as to whether the UE is to flush the earlier measurements.

Consider now a specific example of the embodiment shown in FIG. 1C with an indicator 128 of the cell for which to report CGI in a measurement reporting configuration IE 127. This example includes the configuration of cellForWhichToReportCGI in the measurement reporting configuration with purpose reportCGI. This would avoid the flushing of the measurement reporting entry and timers for each new ECGI/NCGI reporting request. FIG. 2B shows an example ASN.1 code realization with cellForWhichToReportCGI included in the ReportConfigEUTRA IE.

In another specific example of the embodiment shown in FIG. 1C with an indicator 128 of the cell for which to report CGI in a measurement reporting configuration IE 127, the configuration of cellForWhichToReportCGI is included in any measurement reporting configuration, including different event A3-A6 (and any possible new events in future) and present and future periodical measurements. This would also avoid the flushing of the measurement reporting entry and timers for each new ECGI/NCGI reporting request. FIG. 2D shows an example ASN.1 code realization for this example.

In a specific example of the embodiment shown in FIG. 1C with the indicator 128 of the cell for which to report CGI in a measurement identity IE, the cellForWhichToReportCGI could be added as part of MeasId information. The advantage with this embodiment is that it enables the possibility to add ECGI/NCGI measurements on an ongoing measurement without the need to update the measurement object or report config. FIG. 2C shows an example ASN.1 code realization for this example.

Some embodiments are valid for both GUTRAN (NR) and EUTRAN (LTE) specifications. Some embodiments describe, among other things, changing the handling of ECGI/NCGI measurements in order to improve measurement time and enhance mobility performance.

Figure 3:
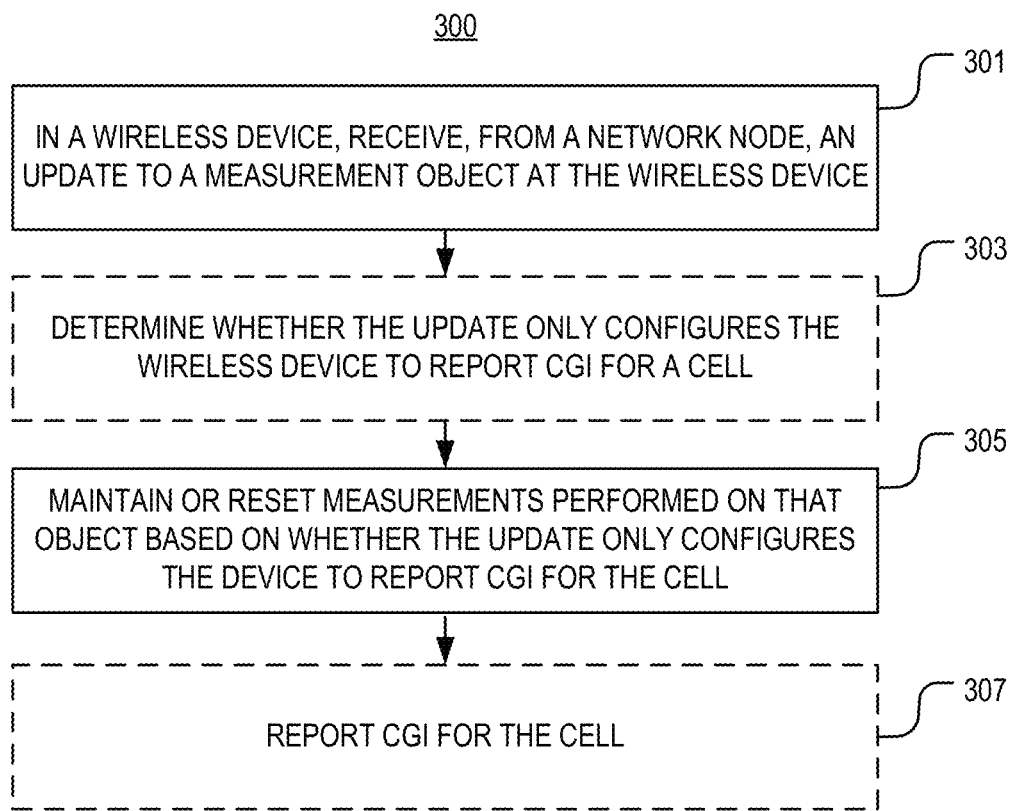
FIG. 3 is a logic flow diagram of a method performed by a wireless device according to some embodiments.

FIG. 3 illustrates one embodiment of a method 300 performed by a wireless device 111 for handling measurements associated with a CGI in accordance with various embodiments described herein. The method 300 includes receiving, by the wireless device 111, from a network node 101, an update 125 to a measurement object 115 at the wireless device 111 (Block 301). The method also includes maintaining or resetting measurements 117 performed on that object 115 based on whether the update 125 only configures the device 111 to report CGI for a cell (Block 305). For example, in some embodiments, maintaining the measurements 1117 is performed responsive to determining that the update 125 only configures the wireless device 111 to report CGI for the cell. And resetting the measurements 117 may be performed responsive to determining that the update 125 does not only configure the wireless device 111 to report CGI for the cell. In some embodiments, then, the method may also include determining whether the update 125 only configures the wireless device 111 to report CGI for a cell (Block 303). In any event, the method 300 as shown in some embodiments may also include reporting CGI for the cell (Block 307).

Figure 4:
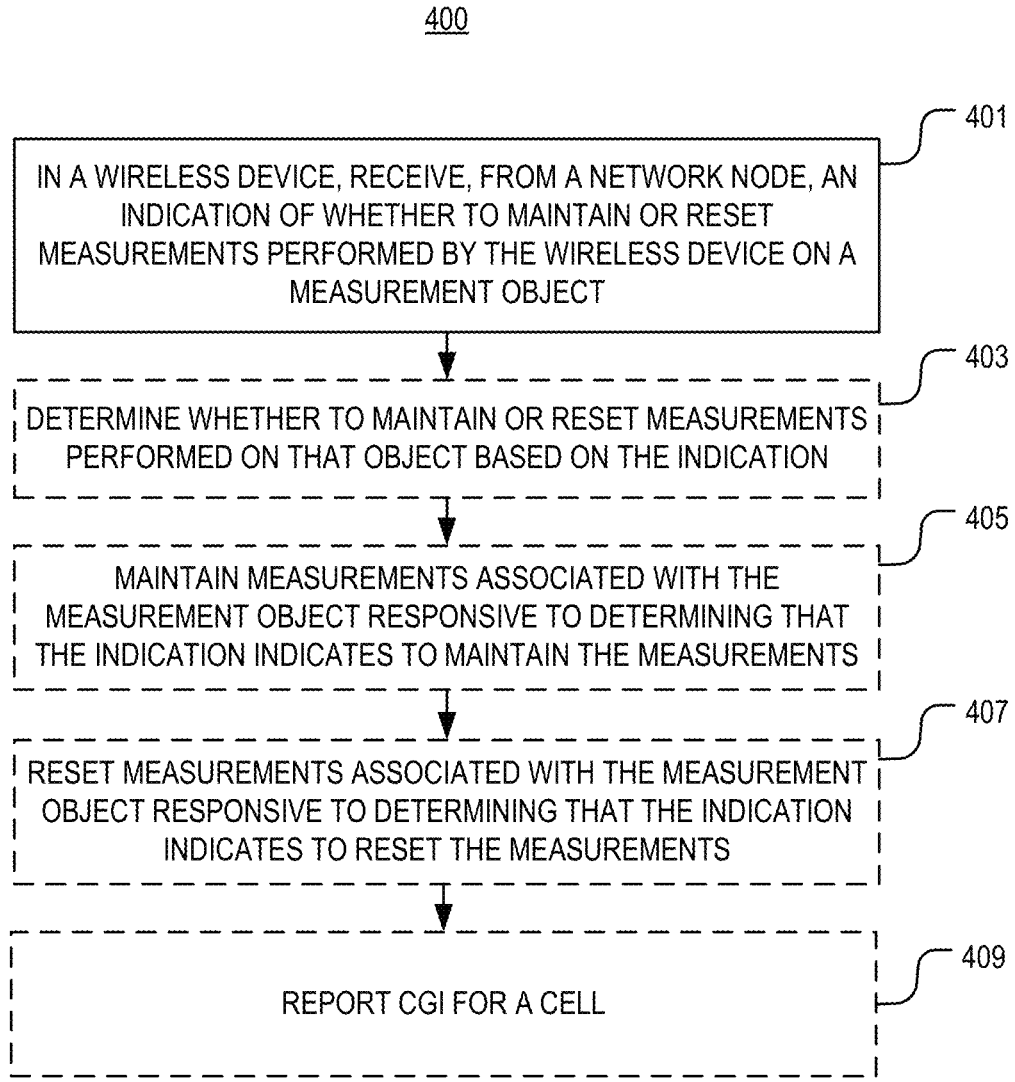
FIG. 4 is a logic flow diagram of a method performed by a wireless device according to other embodiments.

FIG. 4 illustrates one embodiment of a method 400 performed by a wireless device 111 for handling measurements associated with a CGI in accordance with other various embodiments described herein. The method 400 includes receiving, by the wireless device 111, from a network node 101, an indication 126 of whether to maintain or reset measurements 117 performed by the wireless device 111 on a measurement object 115 (Block 401). The indication 126 may for instance be included in the measurement object 115, i.e., an update 125 to the measurement object 115. Regardless, the method 400 may further include determining whether to maintain or reset the measurements 117 performed on that object 115 based on the indication 126 (Block 403). The method 400 may then include maintaining measurements 117 associated with the measurement object 115 responsive to determining that the indication 126 indicates to maintain the measurements 117 (Block 405) or resetting measurements 117 associated with the measurement object 115 responsive to determining that the indication 126 indicates to reset the measurements 117 (Block 407).

In some embodiments, the indication 126 is included in an update 125 to the measurement object 115 which configures the wireless device 111 to report CGI for a cell. If for instance the update 125 only configures the device 111 to report CGI for a cell, the indication 126 in some embodiments indicates the device 111 is to maintain the measurements 117. But if the update 125 does not only configures the device 111 to report CGI for a cell, the indication 126 in some embodiments indicates the device 111 is to reset the measurements 117. Regardless, in some embodiments, the wireless device 111 may therefore report CGI for a cell as configured by the update 125 (Block 409).

Figure 5:
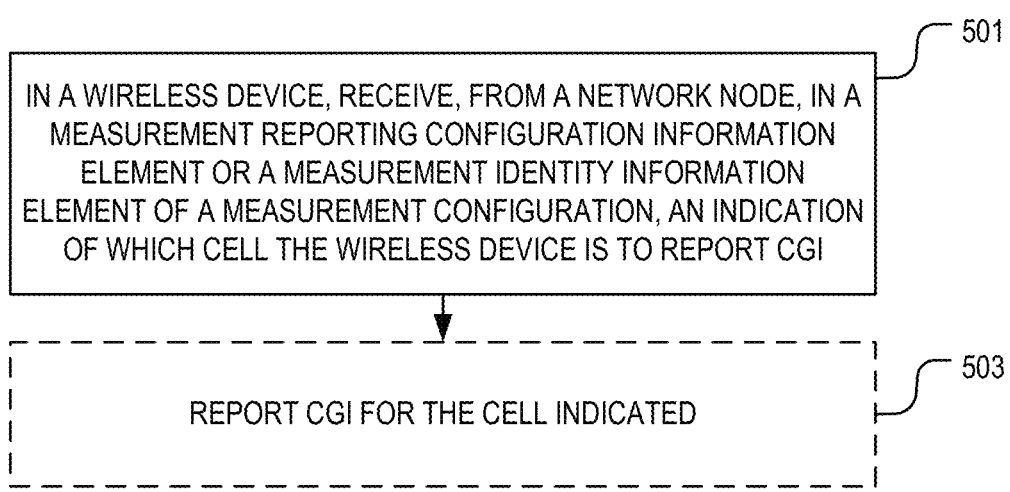
FIG. 5 is a logic flow diagram of a method performed by a wireless device according to still other embodiments.

FIG. 5 illustrates one embodiment of a method 500 performed by a wireless device 111 for handling measurements associated with a CGI in accordance with still other various embodiments described herein. The method 500 as shown includes receiving, by the wireless device 111, from a network node 101, in a measurement reporting configuration information element 127 or a measurement identity information element 129 of a measurement configuration, an indication 128 of which cell the wireless device 111 is to report a CGI (Block 501). The indication 128 may for instance indicate which cell the wireless device 111 is to report a CGI by indicating a physical cell identity, PCI, of the cell for which the wireless device 111 is to report a CGI. Regardless, in some embodiments, the method 500 further includes reporting a CGI for a cell indicated by the received indication 128 (Block 503).

In one or more embodiments, the measurement reporting configuration information element 127 indicates a reporting configuration. The reporting configuration may include the indication 128. In this case, the method in some embodiments may also include adding the reporting configuration to a list of reporting configurations at the wireless device 111, e.g., as opposed to updating an existing reporting configuration at the wireless device 111.

In some embodiments, a reporting configuration indicated by the measurement reporting configuration information element 127 is linked via a measurement identity 132 to a measurement object 115 at the wireless device 111. In this case, the method in some embodiments may also include, responsive to receiving the indication 128, maintaining any measurement reporting entry for the measurement identity in a list of measurement reporting entries at the wireless device 111. Alternatively or additionally, the method may further include receiving an update 125 to the measurement object 115 at the wireless device 111 and, responsive to receiving the update 125, removing a measurement reporting entry for the measurement identity 132 from a list of measurement reporting entries at the wireless device 111 and stopping a timer for the measurement identity 132. That is, the wireless device 111 may flush measurements 117 performed on the measurement object 115 in this case.

Note that the apparatuses described herein may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
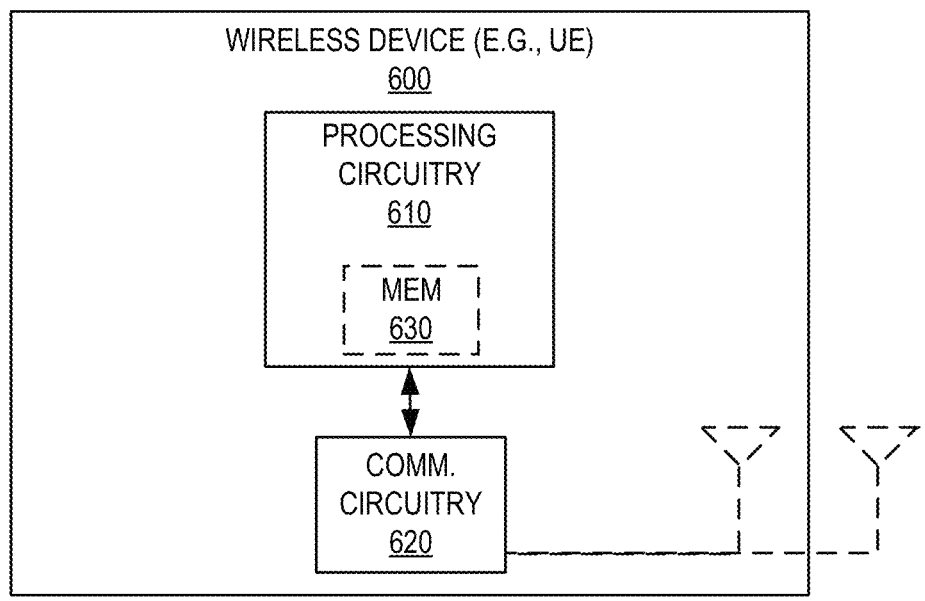
FIG. 6 is a block diagram of a wireless device according to some embodiments.

For example, FIG. 6 illustrates one embodiment of a wireless device 600 in accordance various embodiments described herein. As shown, the wireless device 600 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the wireless device 600. The processing circuitry 610 is configured to perform processing described above, e.g., in any of FIGS. 3-6, such as by executing instructions stored in memory 630. The processing circuitry 610 in this regard may implement certain functional means, units, or modules.

Figure 7:
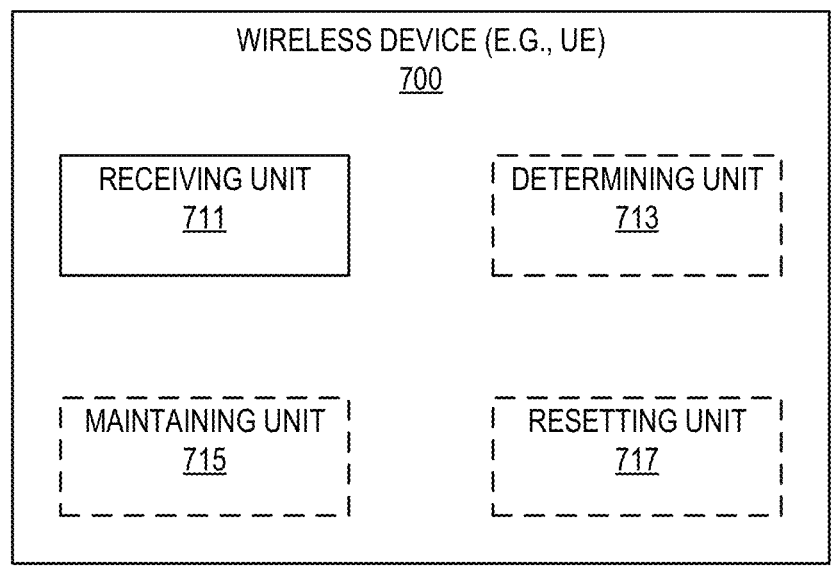
FIG. 7 is a block diagram of a wireless device according to other embodiments.
Figure 11:
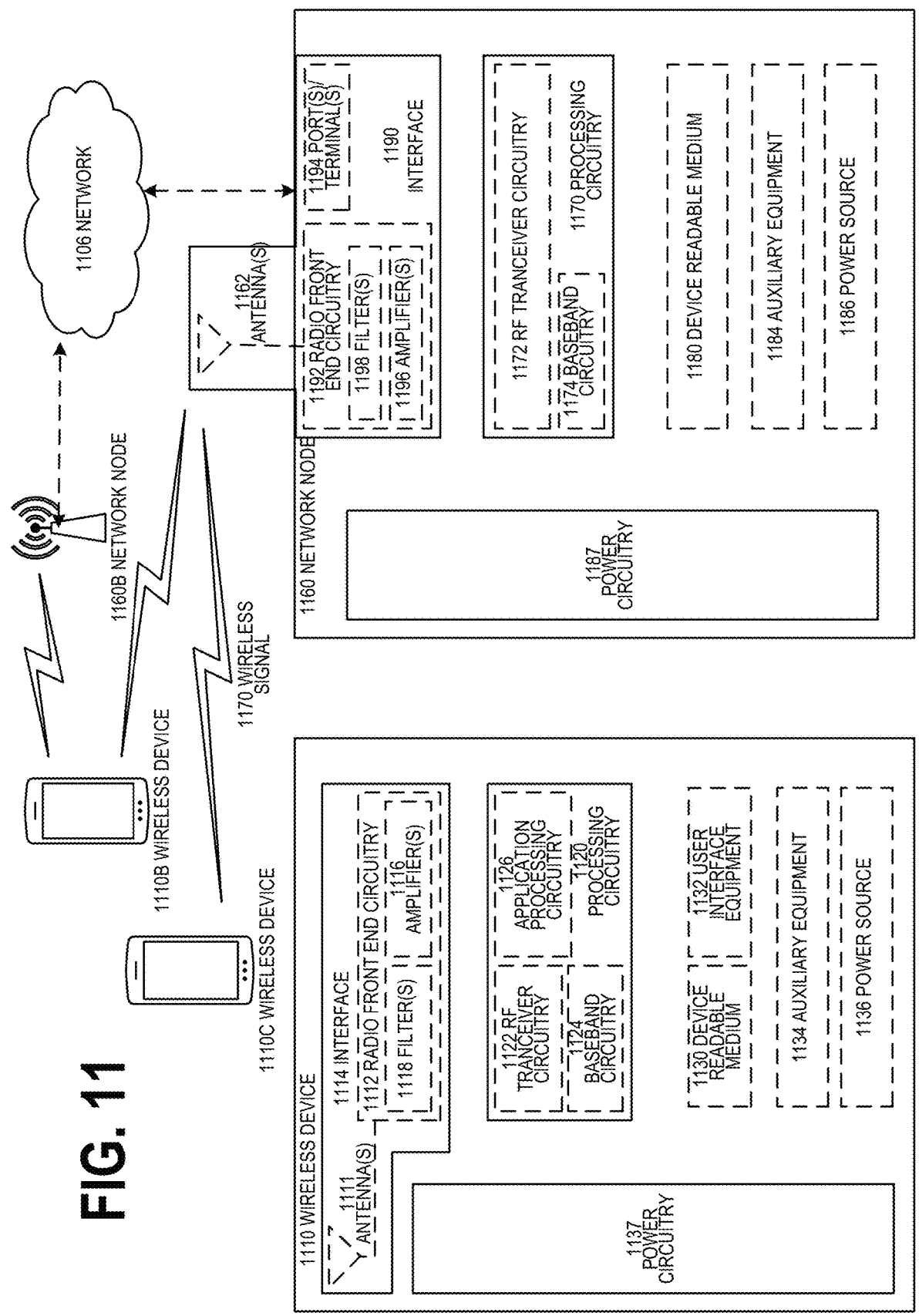
FIG. 11 is a block diagram of a wireless communication network according to some embodiments.

FIG. 7 illustrates a schematic block diagram of one embodiment of a wireless device 700 in a wireless network in accordance various embodiments described herein (for example, the wireless network shown in FIG. 1 and FIG. 11). As shown, the wireless device 700 implements various functional means, units, or modules, e.g., via the processing circuitry 610 in FIG. 6 and/or via software code. In one embodiment, these functional means, units, or modules, e.g., for implementing the method(s) herein, may include for instance: a receiving unit 711 for receiving an update to a measurement object at the wireless device, a determining unit 713 for determining whether the update only configures the wireless device to report CGI for a cell, and a maintaining unit 715 and a resetting unit 717 for respectively maintaining or resetting measurements performed on that object based on whether the update only configures the device to report CGI for the cell.

In another embodiment, these functional means, units, or modules, e.g., for implementing the method(s) herein, may include for instance: a receiving unit 711 for receiving an indication of whether to maintain or reset measurements performed by the wireless device on a measurement object, a determining unit 713 for determining whether to maintain or reset measurements performed on that object based on the indication, and a maintaining unit 715 for maintaining measurements associated with the measurement object responsive to determining that the indication indicates to maintain the measurements, and a resetting unit 717 for resetting measurements associated with the measurement object responsive to determining that the indication indicates to reset the measurements.

In another embodiment, these functional means, units, or modules, e.g., for implementing the method(s) herein, may include for instance, a receiving unit 711 for receiving in a measurement reporting configuration information element or a measurement identity information element of a measurement configuration, an indication of which cell the wireless device is to report CGI.

Figure 8A:
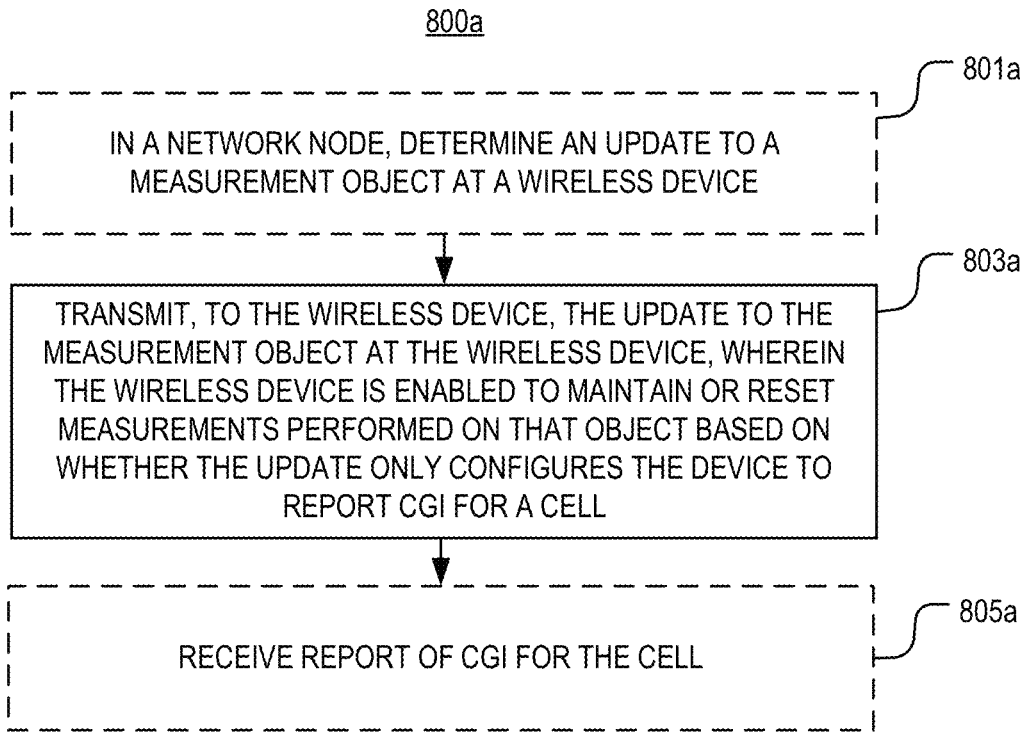
FIG. 8A is a logic flow diagram of a method performed by a network node according to some embodiments.

FIG. 8A illustrates an embodiment of a method 800a performed by a network node 101 for handling measurements associated with a CGI by a wireless device 111 in accordance with various embodiments described herein. The method 800a as shown includes transmitting, by the network node 101, to a wireless device 111, an update 125 to a measurement object 115 at the wireless device 111 (Block 803a). This update 125 enables the wireless device 111 to maintain or reset measurements 117 performed on that object 115 based on whether the update 125 only configures the device 111 to report CGI for a cell. In some embodiments, then, the method 800a further includes determining, by the network node 101, the update 125 to the measurement object 115 at the wireless device 111. Alternatively or additionally, the method 800a may include receiving, from the wireless device 111, a report of a CGI for a cell (Block 805a).

Figure 8B:
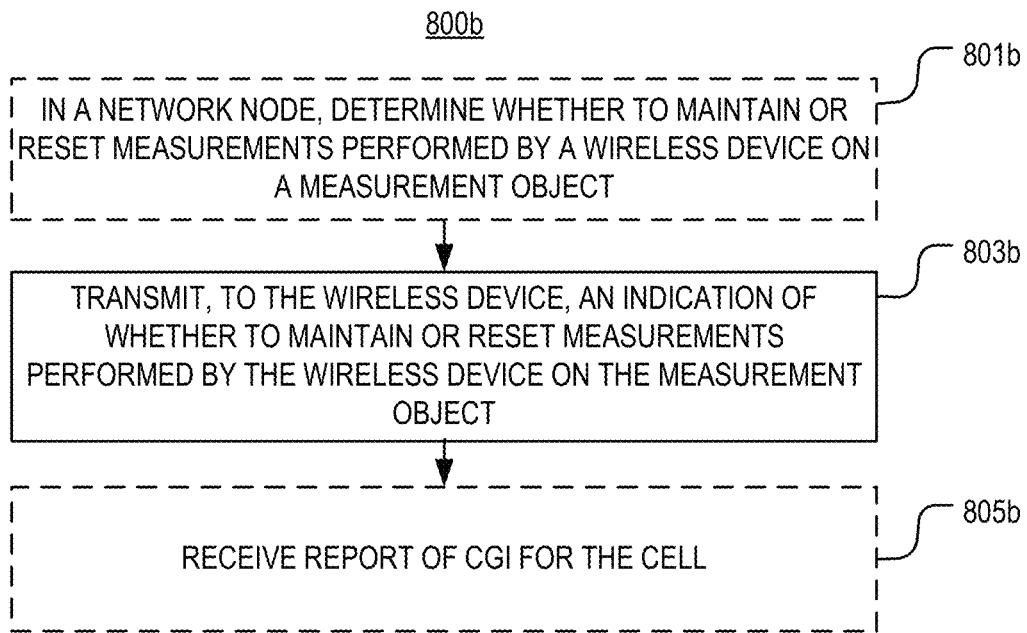
FIG. 8B is a logic flow diagram of a method performed by a network node according to other embodiments.

FIG. 8B illustrates an embodiment of a method 800b performed by a network node 101 for handling measurements associated with a CGI by a wireless device 111 in accordance with other various embodiments described herein. The method as shown includes transmitting, by the network node 101, to a wireless device 111, an indication 126 of whether to maintain or reset measurements 117 performed by the wireless device 111 on a measurement object 115 (Block 803b). The indication 126 may for instance be included in the measurement object 115, i.e., an update 125 to the measurement object 115. Regardless, the method may further include determining whether to maintain or reset the measurements 117 performed on that object 115 (Block 801b).

In some embodiments, the indication 126 is included in an update 125 to the measurement object 115 which configures the wireless device 111 to report CGI for a cell. If for instance the update 125 only configures the device 111 to report CGI for a cell, the indication 126 in some embodiments indicates the device 111 is to maintain the measurements 117. But if the update 125 does not only configures the device 111 to report CGI for a cell, the indication 126 in some embodiments indicates the device 111 is to reset the measurements 117. Regardless, in some embodiments, the method 800b further includes receiving from the wireless device 111 a report of a CGI for a cell as configured by the update 125 (Block 805b).

Figure 8C:
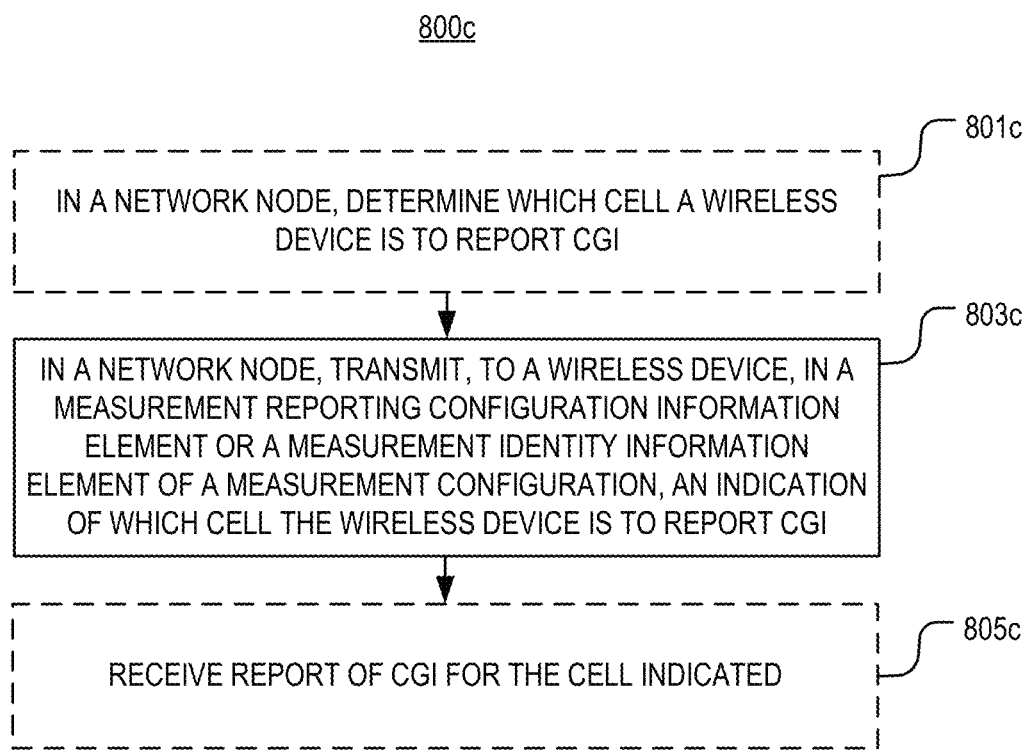
FIG. 8C is a logic flow diagram of a method performed by a network node according to still other embodiments.

FIG. 8C illustrates an embodiment of a method 800c performed by a network node 101 for handling measurements associated with a CGI by a wireless device 111 in accordance with still other various embodiments described herein. The method 800c as shown includes transmitting, by the network node 101, to a wireless device 111, in a measurement reporting configuration information element 127 of a measurement configuration or a measurement identity information element 129 of a measurement configuration, an indication 128 of for which cell the wireless device 111 is to report a CGI (Block 803c). The indication 128 may for instance indicate which cell the wireless device 111 is to report a CGI by indicating a physical cell identity, PCI, of the cell for which the wireless device 111 is to report a CGI. This may be performed for instance after determining which cell the wireless device 111 is to report CGI (Block 801c). Regardless, in some embodiments, the method 800c further includes receiving from the wireless device 111 a report of a CGI for a cell indicated by the indication 128 (Block 805c).

In one or more embodiments, the measurement reporting configuration information element 127 indicates a reporting configuration. The reporting configuration may include the indication 128. In this case, the reporting configuration may be included in a list of reporting configurations that the wireless device 111 is to add to its list of reporting configurations at the wireless device 111, e.g., as opposed to updating an existing reporting configuration at the wireless device 111.

In some embodiments, a reporting configuration indicated by the measurement reporting configuration information element 127 is linked via a measurement identity 132 to a measurement object 115 at the wireless device 111.

Figure 9:
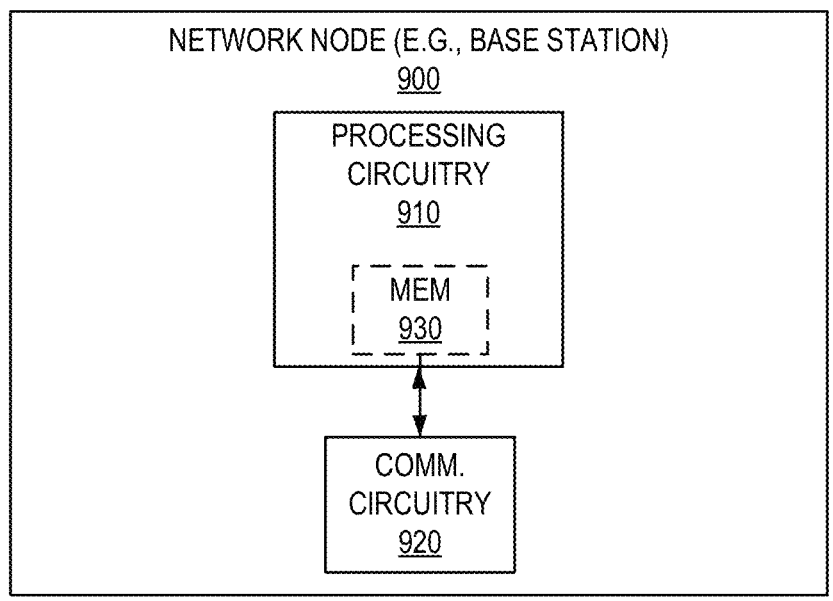
FIG. 9 is a block diagram of a network node according to some embodiments.

FIG. 9 illustrates a network node 900 as implemented in accordance various embodiments described herein. As shown, the network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in any of FIGS. 8A-8C, such as by executing instructions stored in memory 930. The processing circuitry 910 in this regard may implement certain functional means, units, or modules.

Figure 10:
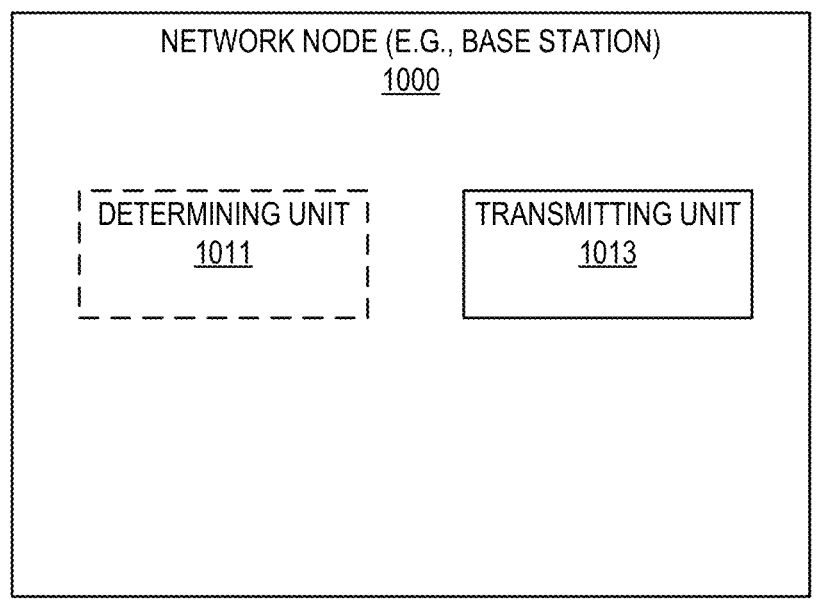
FIG. 10 is a block diagram of a network node according to other embodiments.

FIG. 10 illustrates a schematic block diagram of one embodiment of a network node 1000 in a wireless network in accordance various embodiments described herein (for example, the network node shown in FIG. 1 and FIG. 11). As shown, the network node 1000 implements various functional means, units, or modules, e.g., via the processing circuitry 910 in FIG. 9 and/or via software code. In one embodiment, these functional means, units, or modules, e.g., for implementing the method(s) herein, may include for instance: a determining unit 1011 for determining an update to a measurement object at a wireless device, and a transmitting unit 1013 for transmitting the update to the measurement object at the wireless device. Further, the wireless device is enabled to maintain or reset measurements performed on that object based on whether the update only configures the device to report CGI for a cell.

In another embodiment, these functional means, units, or modules, e.g., for implementing the method(s) herein, may include for instance: a determining unit 1011 for determining whether to maintain or reset measurements performed by a wireless device on a measurement object, and a transmitting unit 1013 for transmitting to the wireless device, an indication of whether to maintain or reset measurements performed by the wireless device on the measurement object.

In another embodiment, these functional means, units, or modules, e.g., for implementing the method(s) herein, may include for instance: a determining unit 1011 for determining which cell the wireless device is to report CGI, and a transmitting unit 1013 for transmitting, in a measurement reporting configuration information element or a measurement identity information element of a measurement configuration, an indication of which cell the wireless device is to report CGI.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. . . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
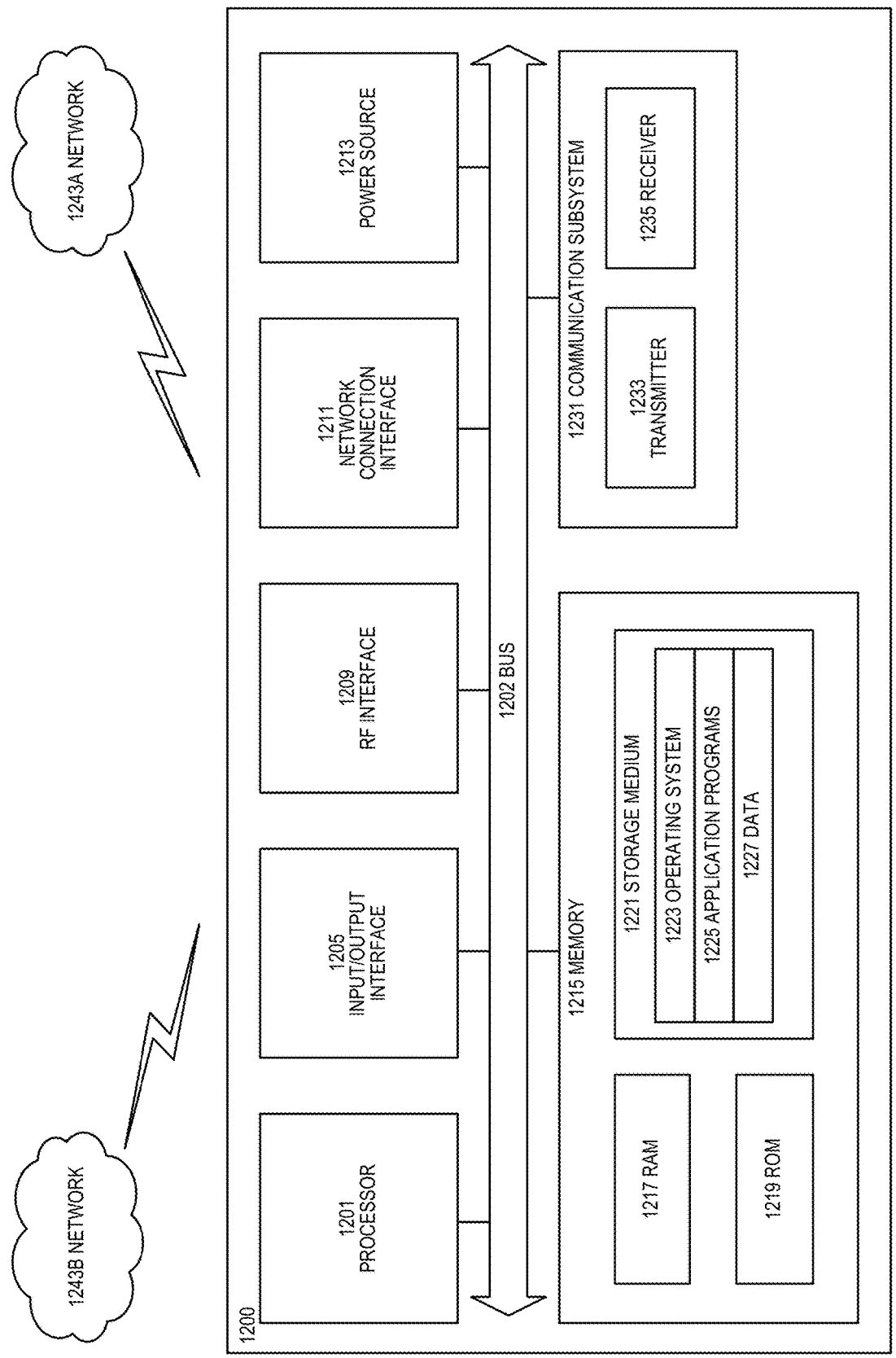
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1220 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
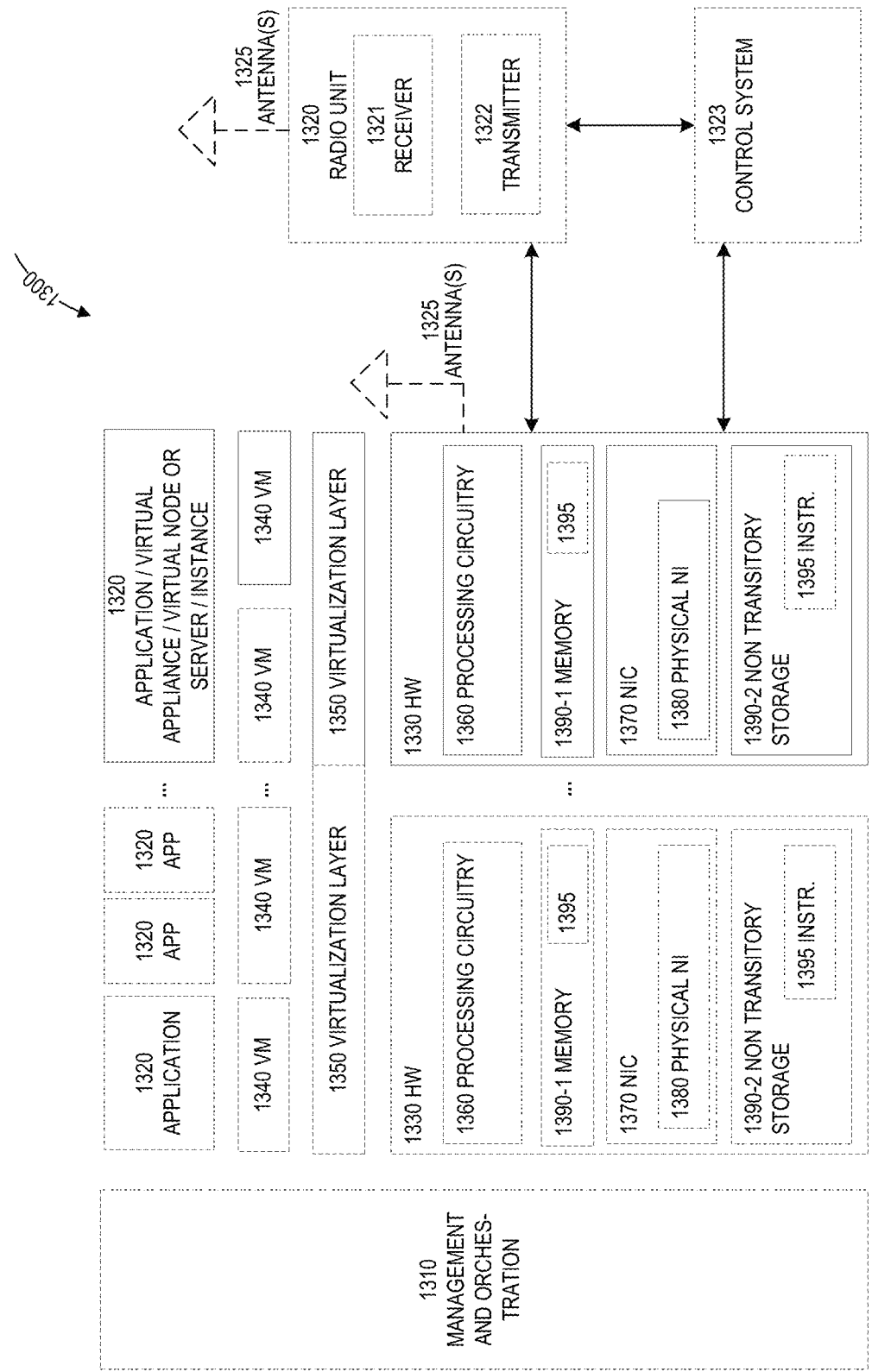
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 1310, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 1320 that each include one or more transmitters 1322 and one or more receivers 1321 may be coupled to one or more antennas 1325. Radio units 1320 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 1323 which may alternatively be used for communication between the hardware nodes 1330 and radio units 1320.

Figure 14:
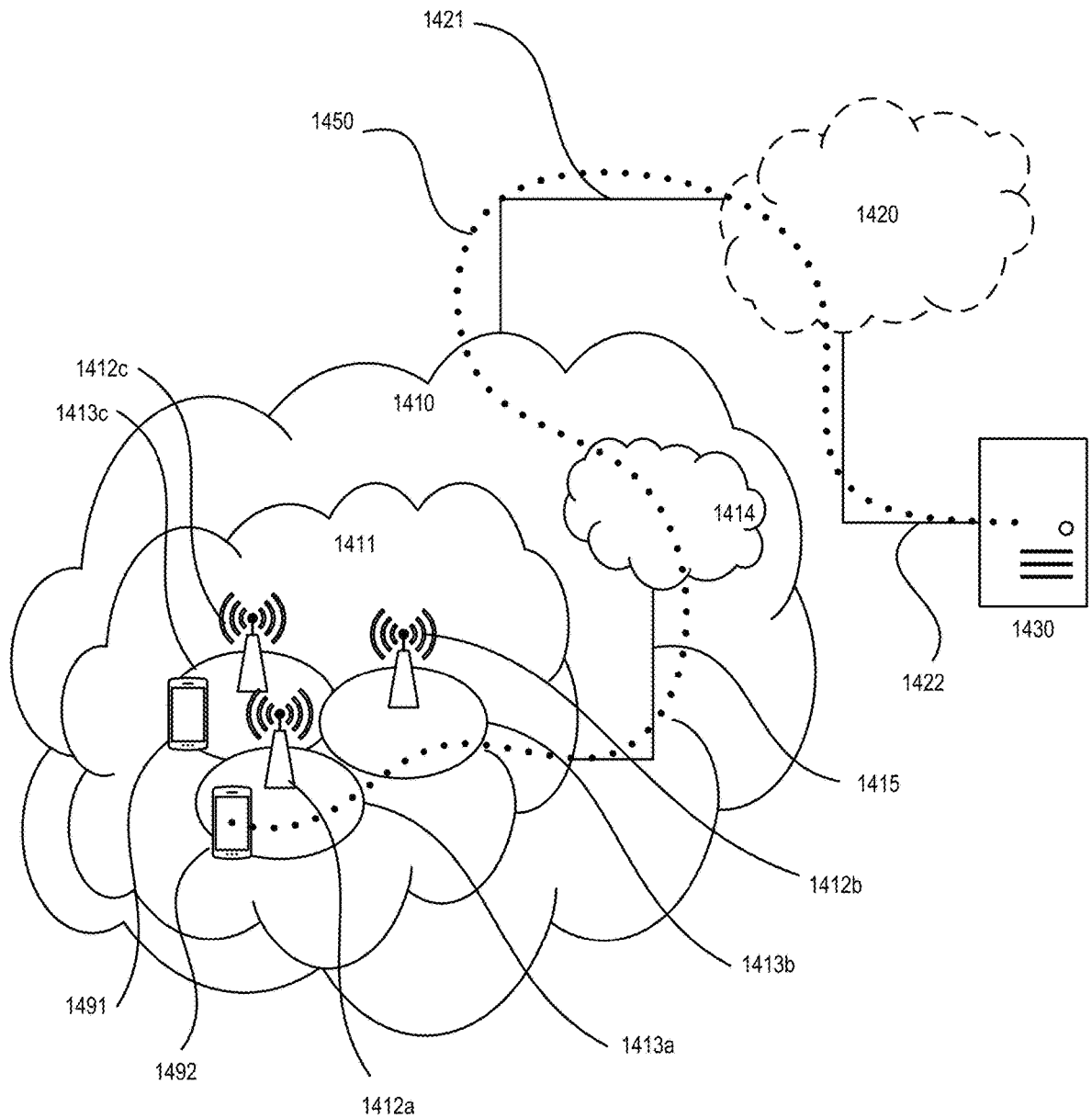
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
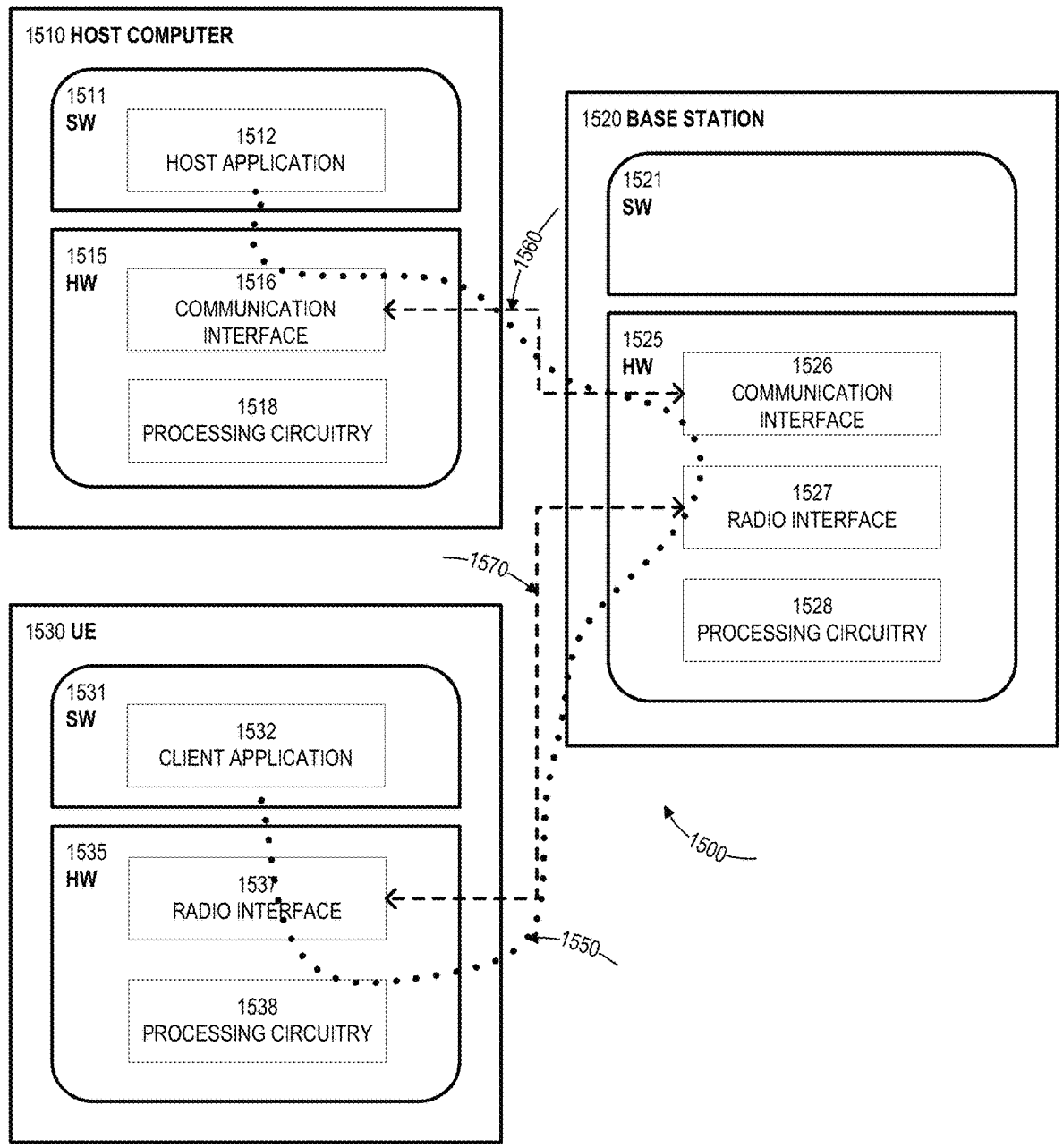
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 15 and independently, the surrounding network topology may be that of FIG. 15.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
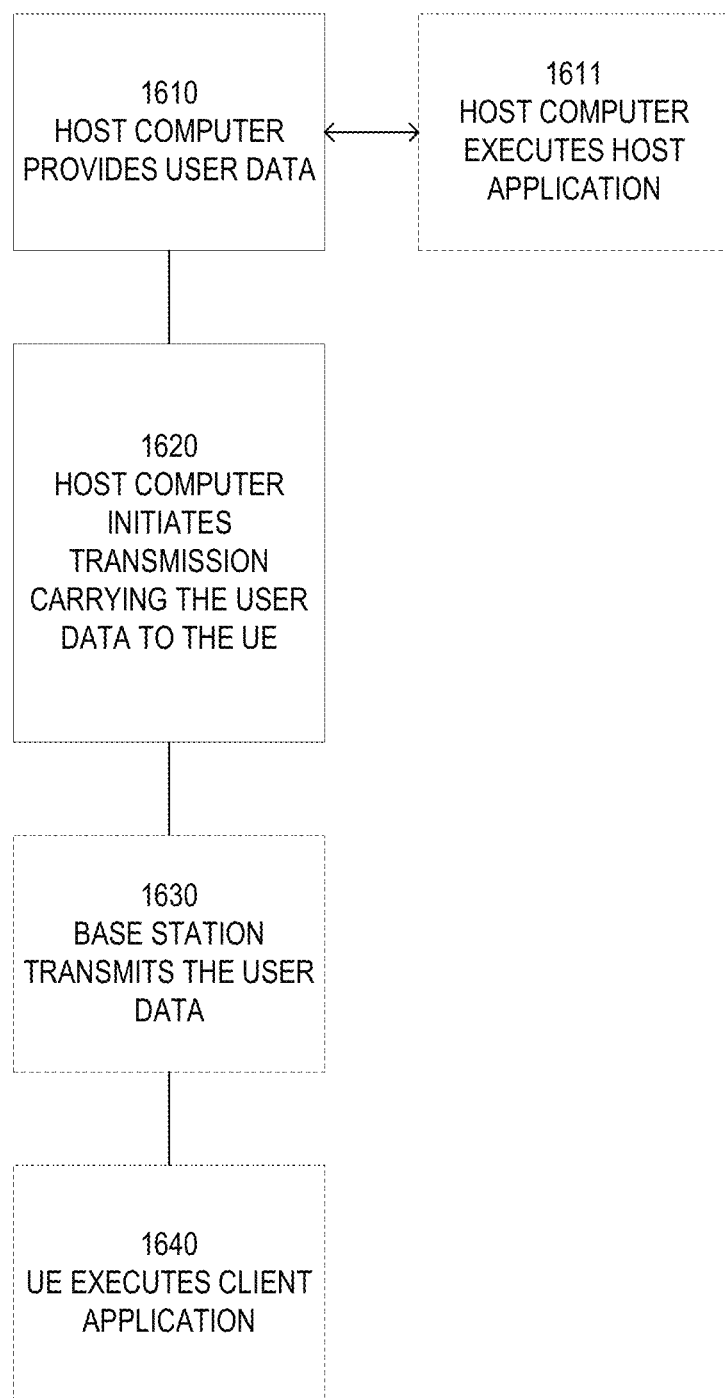
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 16. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
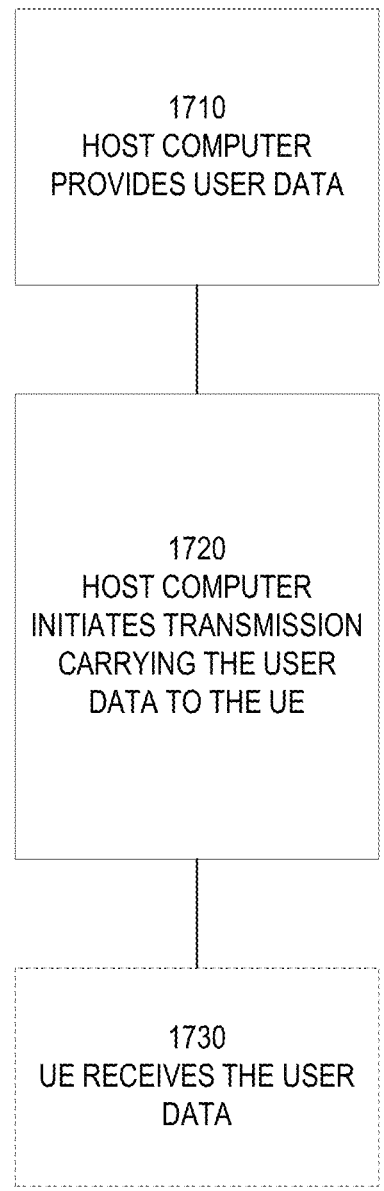
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
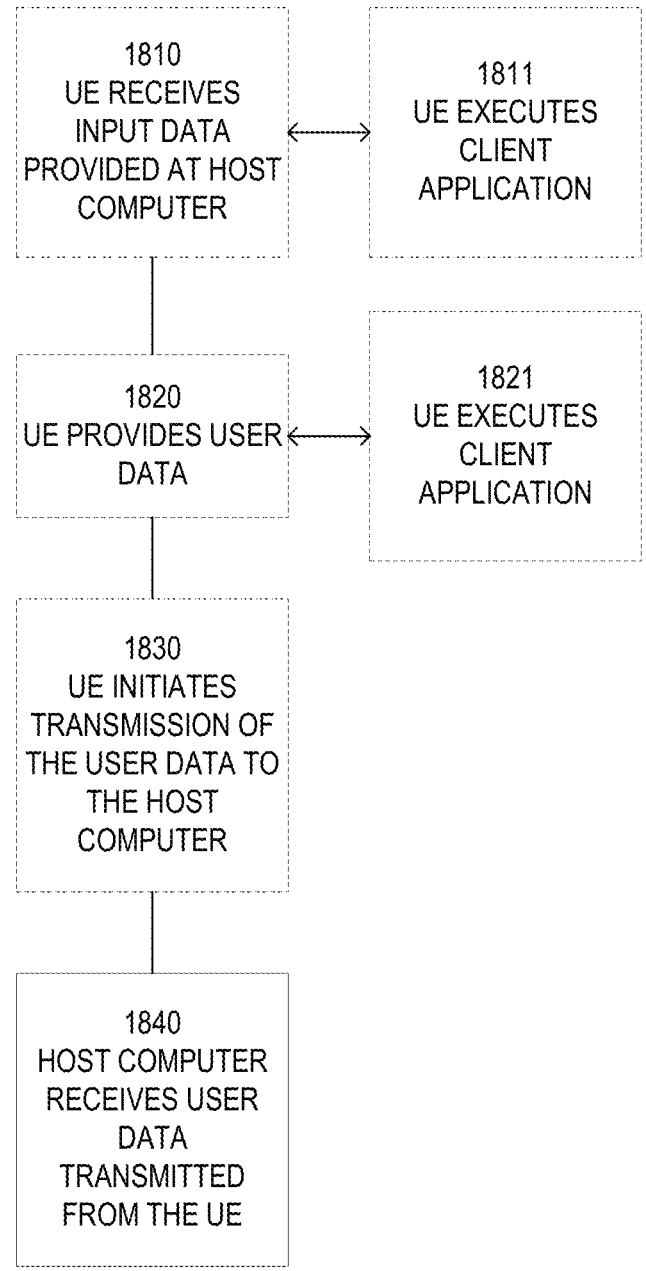
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
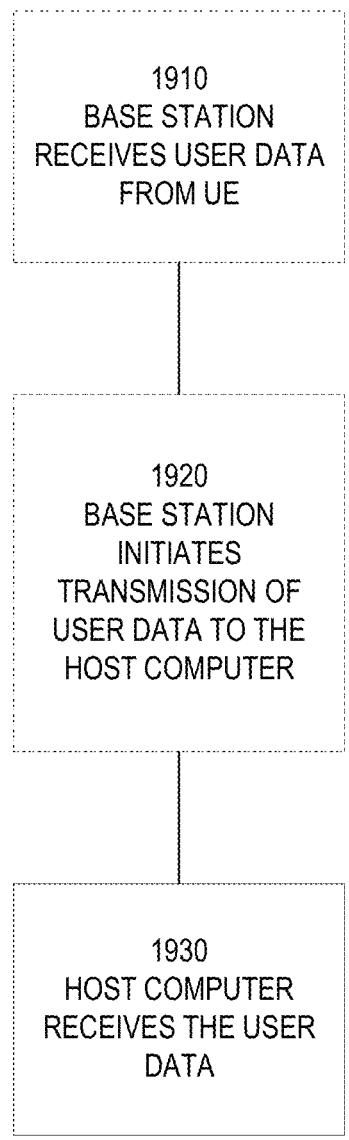
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
receiving, by the wireless device, from a network node, in a measurement reporting configuration information element of a measurement configuration or a measurement identity information element of a measurement configuration, an indication of for which cell the wireless device is to report a cell global identifier, CGI; and
reporting the CGI for the cell indicated by the received indication.

2. The method of claim 1, wherein the indication is received in the measurement reporting configuration information element.

3. The method of claim 2, wherein the measurement reporting configuration information element indicates a reporting configuration, wherein the reporting configuration includes the indication, and wherein the method further comprises adding the reporting configuration to a list of reporting configurations at the wireless device.

4. The method of claim 1, wherein a reporting configuration indicated by the measurement reporting configuration information element is linked via a measurement identity to a measurement object at the wireless device, and wherein the method further comprises, responsive to receiving the indication, maintaining any measurement reporting entry for the measurement identity in a list of measurement reporting entries at the wireless device.

5. The method of claim 1, wherein a reporting configuration indicated by the measurement reporting configuration information element is linked via a measurement identity to a measurement object at the wireless device, and wherein the method further comprises:
receiving an update to the measurement object at the wireless device; and
responsive to receiving the update, removing a measurement reporting entry for the measurement identity from a list of measurement reporting entries at the wireless device and stopping a timer for the measurement identity.

6. The method of claim 1, wherein the indication indicates which cell the wireless device is to report a CGI by indicating a physical cell identity, PCI, of the cell for which the wireless device is to report a CGI.

7. A method performed by a network node, the method comprising:
transmitting, by the network node, to a wireless device, in a measurement reporting configuration information element of a measurement configuration or a measurement identity information element of a measurement configuration, an indication of for which cell the wireless device is to report a CGI; and
receiving, from the wireless device, a report of the CGI for the cell indicated by the transmitted indication.

8. The method of claim 7, wherein the indication is transmitted in the measurement reporting configuration information element.

9. The method of claim 8, wherein the measurement reporting configuration information element indicates a reporting configuration that the wireless device is to add to a list of reporting configurations at the wireless device, and wherein the reporting configuration includes the indication.

10. The method of claim 7, wherein the indication indicates which cell the wireless device is to report a CGI by indicating a physical cell identity, PCI, of the cell for which the wireless device is to report a CGI.

11. A wireless device comprising:
processing circuitry configured to:
receive, from a network node, in a measurement reporting configuration information element of a measurement configuration or a measurement identity information element of a measurement configuration, an indication of for which cell the wireless device is to report a cell global identifier, CGI; and
report the CGI for the cell indicated by the received indication.

12. The wireless device of claim 11, wherein the indication is received in the measurement reporting configuration information element.

13. The wireless device of claim 12, wherein the measurement reporting configuration information element indicates a reporting configuration, wherein the reporting configuration includes the indication, and wherein the processing circuitry is further configured to add the reporting configuration to a list of reporting configurations at the wireless device.

14. The wireless device of claim 11, wherein a reporting configuration indicated by the measurement reporting configuration information element is linked via a measurement identity to a measurement object at the wireless device, and wherein the processing circuitry is further configured to, responsive to receiving the indication, maintain any measurement reporting entry for the measurement identity in a list of measurement reporting entries at the wireless device.

15. The wireless device of claim 11, wherein a reporting configuration indicated by the measurement reporting configuration information element is linked via a measurement identity to a measurement object at the wireless device, and wherein the processing circuitry is further configured to:
receive an update to the measurement object at the wireless device; and
responsive to receiving the update, remove a measurement reporting entry for the measurement identity from a list of measurement reporting entries at the wireless device and stop a timer for the measurement identity.

16. The wireless device of claim 11, wherein the indication indicates which cell the wireless device is to report a CGI by indicating a physical cell identity, PCI, of the cell for which the wireless device is to report a CGI.

17. A network node comprising:
processing circuitry configured to:
transmit, to a wireless device, in a measurement reporting configuration information element of a measurement configuration or a measurement identity information element of a measurement configuration, an indication of for which cell the wireless device is to report a CGI; and
receive, from the wireless device, a report of the CGI for the cell indicated by the transmitted indication.

18. The network node of claim 17, wherein the indication is transmitted in the measurement reporting configuration information element.

19. The network node of claim 18, wherein the measurement reporting configuration information element indicates a reporting configuration that the wireless device is to add to a list of reporting configurations at the wireless device, and wherein the reporting configuration includes the indication.

20. The network node of claim 17, wherein the indication indicates which cell the wireless device is to report a CGI by indicating a physical cell identity, PCI, of the cell for which the wireless device is to report a CGI.

21. A computer-readable storage medium on which is stored a computer program comprising instructions which, when executed by at least one processor of a wireless device, causes the wireless device to:
receive, from a network node, in a measurement reporting configuration information element of a measurement configuration or a measurement identity information element of a measurement configuration, an indication of for which cell the wireless device is to report a cell global identifier, CGI; and
report the CGI for the cell indicated by the received indication.

22. A computer-readable storage medium on which is stored a computer program comprising instructions which, when executed by at least one processor of a network node, causes the network node to:
transmit, to a wireless device, in a measurement reporting configuration information element of a measurement configuration or a measurement identity information element of a measurement configuration, an indication of for which cell the wireless device is to report a CGI; and
receive, from the wireless device, a report of the CGI for the cell indicated by the transmitted indication.

23. The wireless device of claim 11, wherein the indication is a physical cell identity, PCI, of the cell for which the wireless device is to report a CGI.

24. The network node of claim 17, wherein the indication is a physical cell identity, PCI, of the cell for which the wireless device is to report a CGI.

* * * * *